(12) United States Patent
Barnes, Jr.

(10) Patent No.: US 8,799,097 B2
(45) Date of Patent: *Aug. 5, 2014

(54) ACCESSING REMOTE SYSTEMS USING IMAGE CONTENT

(75) Inventor: Melvin L. Barnes, Jr., Henderson, NV (US)

(73) Assignee: Wounder GmbH., LLC, Dover, DE (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/316,331

(22) Filed: Dec. 9, 2011

(65) Prior Publication Data

US 2012/0084817 A1    Apr. 5, 2012

Related U.S. Application Data

(63) Continuation of application No. 12/775,980, filed on May 7, 2010, now Pat. No. 8,204,793, which is a continuation of application No. 11/556,430, filed on Nov. 3, 2006, now Pat. No. 7,725,360, which is a continuation of application No. 09/606,350, filed on Jun. 29, 2000, now Pat. No. 7,133,837.

(51) Int. Cl.
    *G06Q 30/00*    (2012.01)
(52) U.S. Cl.
    USPC ...... 705/26.1; 705/27.1; 705/26.81; 455/419; 348/220.01; 348/E79.008; 704/275; 704/E79.008; 709/223; 709/224; 382/313
(58) Field of Classification Search
    USPC ............. 705/26.1, 27.1, 26.81; 709/224, 223; 382/313; 348/220.01, E7.079; 455/419; 704/275, E19.008
    See application file for complete search history.

(56) References Cited

U.S. PATENT DOCUMENTS

| | | |
|---|---|---|
| 4,908,848 A | 3/1990 | Hanawa |
| 5,083,800 A | 1/1992 | Lockton |
| 5,093,718 A | 3/1992 | Hoarty et al. |
| 5,093,921 A | 3/1992 | Bevins, Jr. |
| 5,113,440 A | 5/1992 | Harney et al. |
| 5,120,076 A | 6/1992 | Luxenberg et al. |
| 5,203,009 A | 4/1993 | Bogusz et al. |
| 5,227,874 A | 7/1993 | Von Kohorn |
| 5,249,044 A | 9/1993 | Von Kohorn |
| 5,283,734 A | 2/1994 | Von Kohorn |
| 5,297,205 A | 3/1994 | Audebert et al. |
| 5,539,822 A | 7/1996 | Lett |
| 5,541,862 A | 7/1996 | Adams et al. |
| 5,559,550 A | 9/1996 | Mankovitz |

(Continued)

FOREIGN PATENT DOCUMENTS

JP    9307617 A    11/1997

OTHER PUBLICATIONS

DAKSS, Hyperactive: An automated tool for creating hyperliked video, Massachusetts Institute of Technology, 1999.

(Continued)

*Primary Examiner* — Yogesh C Garg

(57) ABSTRACT

Systems and methods allow users to capture an image and transmit data to a remote system. An embodiment includes a method comprising capturing, at a mobile device, an image; generating, at the mobile device, text from the image using a recognition algorithm; and transmitting, from the mobile device, the text to a remote system.

16 Claims, 5 Drawing Sheets

(56) References Cited

U.S. PATENT DOCUMENTS

| | | |
|---|---|---|
| 5,615,296 A | 3/1997 | Stanford et al. |
| 5,635,978 A | 6/1997 | Alten et al. |
| 5,640,193 A | 6/1997 | Wellner |
| 5,719,619 A | 2/1998 | Hattori et al. |
| 5,732,398 A | 3/1998 | Tagawa |
| 5,734,413 A | 3/1998 | Lappington et al. |
| 5,737,491 A | 4/1998 | Allen et al. |
| 5,764,275 A | 6/1998 | Lappington et al. |
| 5,859,662 A | 1/1999 | Cragun et al. |
| 5,870,708 A | 2/1999 | Stewart |
| 5,915,214 A | 6/1999 | Reece et al. |
| 5,930,473 A | 7/1999 | Teng et al. |
| 5,933,811 A | 8/1999 | Angles et al. |
| 5,938,727 A | 8/1999 | Ikeda |
| 5,963,625 A | 10/1999 | Kawecki et al. |
| 5,983,200 A | 11/1999 | Slotznick |
| 6,011,782 A | 1/2000 | Desimone et al. |
| 6,016,476 A | 1/2000 | Maes et al. |
| 6,026,375 A | 2/2000 | Hall et al. |
| 6,036,086 A | 3/2000 | Sizer, II et al. |
| 6,038,199 A | 3/2000 | Pawlowski et al. |
| 6,070,155 A | 5/2000 | Cherrington et al. |
| 6,075,527 A | 6/2000 | Ichihashi et al. |
| 6,081,629 A * | 6/2000 | Browning ............... 382/313 |
| 6,081,731 A | 6/2000 | Boltz et al. |
| 6,088,450 A | 7/2000 | Davis et al. |
| 6,119,944 A | 9/2000 | Mulla et al. |
| 6,144,848 A | 11/2000 | Walsh et al. |
| 6,169,789 B1 | 1/2001 | Rao et al. |
| 6,202,023 B1 | 3/2001 | Hancock et al. |
| 6,212,401 B1 | 4/2001 | Ackley |
| 6,219,653 B1 | 4/2001 | O'Neill et al. |
| 6,229,533 B1 | 5/2001 | Farmer et al. |
| 6,230,970 B1 | 5/2001 | Walsh et al. |
| 6,259,657 B1 | 7/2001 | Swinney |
| 6,269,361 B1 | 7/2001 | Davis et al. |
| 6,289,140 B1 * | 9/2001 | Oliver ............... 382/313 |
| 6,337,947 B1 | 1/2002 | Porter et al. |
| 6,356,539 B1 | 3/2002 | Zuliani et al. |
| 6,411,725 B1 | 6/2002 | Rhoads |
| 6,446,871 B1 | 9/2002 | Buckley et al. |
| 6,493,688 B1 | 12/2002 | Das et al. |
| 6,510,461 B1 * | 1/2003 | Nielsen ............... 709/224 |
| 6,512,916 B1 | 1/2003 | Forbes, Jr. |
| 6,512,919 B2 | 1/2003 | Ogasawara |
| 6,553,566 B1 | 4/2003 | Grant et al. |
| 6,571,279 B1 | 5/2003 | Herz et al. |
| 6,577,861 B2 | 6/2003 | Ogasawara |
| 6,587,835 B1 | 7/2003 | Treyz et al. |
| 6,604,239 B1 | 8/2003 | Kohen |
| 6,637,029 B1 | 10/2003 | Maissel et al. |
| 6,647,257 B2 | 11/2003 | Owensby |
| 6,665,085 B1 | 12/2003 | Edmunds et al. |
| 6,671,567 B1 | 12/2003 | Dwyer et al. |
| 6,674,874 B1 | 1/2004 | Yoshida et al. |
| 6,707,465 B2 | 3/2004 | Yamazaki et al. |
| 6,707,581 B1 | 3/2004 | Browning |
| 6,779,113 B1 | 8/2004 | Guthery |
| 6,812,995 B2 | 11/2004 | Honma |
| 6,813,608 B1 | 11/2004 | Baranowski |
| 6,873,260 B2 | 3/2005 | Lancos et al. |
| 6,928,655 B1 | 8/2005 | Omoigui |
| 6,961,954 B1 | 11/2005 | Maybury et al. |
| 6,965,868 B1 | 11/2005 | Bednarek |
| 6,973,333 B1 | 12/2005 | O'Neil |
| 6,975,873 B1 | 12/2005 | Banks et al. |
| 6,987,975 B1 | 1/2006 | Irvin et al. |
| 7,024,205 B1 | 4/2006 | Hose |
| 7,058,395 B2 | 6/2006 | Dowling et al. |
| 7,072,886 B2 | 7/2006 | Salmenkaita et al. |
| 7,133,837 B1 | 11/2006 | Barnes, Jr. |
| 7,184,774 B2 | 2/2007 | Robinson et al. |
| 7,209,903 B1 | 4/2007 | Mamdani et al. |
| 7,239,346 B1 * | 7/2007 | Priddy ............... 348/220.1 |
| 7,283,974 B2 | 10/2007 | Katz et al. |
| 7,418,268 B1 | 8/2008 | Cabano et al. |
| 7,467,141 B1 | 12/2008 | Steele et al. |
| 7,487,112 B2 | 2/2009 | Barnes, Jr. |
| 7,503,051 B1 | 3/2009 | Ueda et al. |
| 7,725,360 B2 | 5/2010 | Barnes, Jr. |
| 7,725,812 B1 | 5/2010 | Balkus et al. |
| 7,917,439 B2 | 3/2011 | Barnes, Jr. |
| 8,204,793 B2 | 6/2012 | Barnes, Jr. |
| 2001/0003177 A1 | 6/2001 | Schena et al. |
| 2001/0014868 A1 | 8/2001 | Herz et al. |
| 2001/0033296 A1 | 10/2001 | Fullerton et al. |
| 2001/0034603 A1 | 10/2001 | Thrift et al. |
| 2001/0036821 A1 | 11/2001 | Gainsboro et al. |
| 2002/0000468 A1 | 1/2002 | Bansal |
| 2002/0002504 A1 | 1/2002 | Engel et al. |
| 2002/0016171 A1 | 2/2002 | Doganata et al. |
| 2002/0031108 A1 | 3/2002 | Inoue |
| 2002/0049717 A1 | 4/2002 | Routtenberg et al. |
| 2002/0055817 A1 | 5/2002 | Chou |
| 2002/0078456 A1 | 6/2002 | Hudson et al. |
| 2002/0126780 A1 | 9/2002 | Oshima et al. |
| 2002/0136226 A1 | 9/2002 | Christoffel et al. |
| 2002/0143655 A1 | 10/2002 | Elston et al. |
| 2002/0158546 A1 | 10/2002 | Ramaswamy |
| 2002/0180582 A1 | 12/2002 | Nielsen |
| 2002/0191570 A1 | 12/2002 | Kim et al. |
| 2002/0198021 A1 | 12/2002 | Boesen |
| 2002/0198716 A1 | 12/2002 | Zimmerman |
| 2003/0008644 A1 | 1/2003 | Akhterzzaman et al. |
| 2003/0020629 A1 | 1/2003 | Swartz et al. |
| 2003/0020744 A1 | 1/2003 | Ellis et al. |
| 2003/0054802 A1 | 3/2003 | Xie |
| 2003/0061606 A1 | 3/2003 | Hartwig et al. |
| 2003/0063072 A1 | 4/2003 | Brandenberg et al. |
| 2003/0065805 A1 | 4/2003 | Barnes |
| 2003/0066883 A1 | 4/2003 | Yu |
| 2003/0069763 A1 | 4/2003 | Gathman et al. |
| 2003/0083061 A1 | 5/2003 | Robinson et al. |
| 2003/0083080 A1 | 5/2003 | Fournier et al. |
| 2003/0132298 A1 | 7/2003 | Swartz et al. |
| 2003/0139180 A1 | 7/2003 | McIntosh et al. |
| 2003/0147099 A1 | 8/2003 | Heimendinger et al. |
| 2003/0153264 A1 | 8/2003 | Osato et al. |
| 2003/0163558 A1 | 8/2003 | Cao et al. |
| 2003/0220835 A1 | 11/2003 | Barnes |
| 2004/0073631 A1 | 4/2004 | Keorkunian et al. |
| 2004/0203608 A1 | 10/2004 | Osann |
| 2004/0203998 A1 | 10/2004 | Knauerhase et al. |
| 2005/0088279 A1 | 4/2005 | Denison et al. |
| 2005/0091118 A1 | 4/2005 | Fano |
| 2005/0136949 A1 | 6/2005 | Barnes |
| 2006/0069749 A1 | 3/2006 | Herz et al. |
| 2006/0215029 A1 | 9/2006 | Katz |
| 2007/0005795 A1 | 1/2007 | Gonzalez |
| 2007/0061845 A1 | 3/2007 | Barnes |
| 2007/0118426 A1 | 5/2007 | Barnes, Jr. |
| 2007/0173266 A1 | 7/2007 | Barnes |
| 2009/0144624 A1 | 6/2009 | Barnes, Jr. |
| 2010/0222090 A1 | 9/2010 | Barnes, Jr. |
| 2011/0170837 A1 | 7/2011 | Barnes, Jr. |
| 2012/0084805 A1 | 4/2012 | Barnes, Jr. |
| 2012/0086549 A1 | 4/2012 | Barnes, Jr. |
| 2012/0089470 A1 | 4/2012 | Barnes, Jr. |
| 2012/0095844 A1 | 4/2012 | Barnes, Jr. |
| 2012/0096358 A1 | 4/2012 | Barnes, Jr. |
| 2012/0096490 A1 | 4/2012 | Barnes, Jr. |

OTHER PUBLICATIONS

Dedrick. "A Consumption Model for targeted Electronic Advertising", MultiMedia IEEE. Summer 1995.
U.S. Appl. No. 09/608,350, filed Jun. 29, 2000, Melvin L. Barnes, Jr.
U.S. Appl. No. 10/154,008, filed May 23, 2002, Melvin L. Barnes, Jr.
U.S. Appl. No. 10/154,016, filed May 23, 2002, Melvin L. Barnes, Jr.
U.S. Appl. No. 11/030,969, filed Jan. 10, 2005, Melvin L. Barnes, Jr.
U.S. Appl. No. 11/556,430, filed Nov. 3, 2006, Melvin L. Barnes, Jr.
U.S. Appl. No. 11/624,906, filed Jan. 19, 2007, Melvin L. Barnes, Jr.
U.S. Appl. No. 11/696,387, filed Apr. 4, 2007, Melvin L. Barnes, Jr.
U.S. Appl. No. 12/345,420, filed Dec. 29, 2008, Melvin L. Barnes, Jr.

(56) References Cited

OTHER PUBLICATIONS

U.S. Appl. No. 12/755,980, filed May 7, 2010, Melvin L. Barnes, Jr.
U.S. Appl. No. 13/073,837, filed Mar. 28, 2011, Melvin L. Barnes, Jr.
U.S. Appl. No. 13/323,253, filed Dec. 12, 2011, Melvin L. Barnes, Jr.
U.S. Appl. No. 13/327,520, filed Dec. 15, 2011, Melvin L. Barnes, Jr.
U.S. Appl. No. 13/328,725, filed Dec. 16, 2011, Melvin L. Barnes, Jr.
U.S. Appl. No. 13/331,049, filed Dec. 20, 2011, Melvin L. Barnes, Jr.
U.S. Appl. No. 13/334,783, filed Dec. 22, 2011, Melvin L. Barnes, Jr.
U.S. Appl. No. 13/335,354, filed Dec. 22, 2011, Melvin L. Barnes, Jr.
U.S. Appl. No. 13/672,662, filed Nov. 8, 2012, Melvin L. Barnes Jr.
U.S. Appl. No. 13/693,705, filed Dec. 4, 2012, Melvin L. Barnes Jr.
Anderson, Heidi "GPS: It's Everywhere You Want to Be", Fireless Computing, vol. 8, Issue 5, 2002, 25-28.
Carmack, Carmen, The Evolution of the Pen, Wireless Computing, vol. 8, Issue 5, 2002, 99-102.
Smith, Steven, "PDA Apps To Go", Wireless Computing. vol. 8, Issue 5, 2002, 59-60.
Dodd, Jeff, "3G & The Future of Wireless", Wireless Computing, vol. 8, Issue 5, 2002, 48-51.
Dodd, Jeff, "A Generation in Waiting", Wireless Computing, vol. 8, Issue 5, 2002, 45-47.
Dodd, Jeff, "PDAs Cell Phones Battle It Out", Wireless Computing, vol. 8, Issue 5, 2002, 52-53.
Dodd, Jeff, "Reach Out & Surf Somewhere With 2g", Wireless computing, vol. 8, Issue 5, 2002, 41-44.
Dodd, Jeff, "The PDA as a Communicator", Wireless Computing, vol. 8, Issue 5, 2002, 38-40.
Edge-Salois, Bryan, "Mobile Messenger Devices Keep Users Mobile", Wireless Computing, vol. 8, Issue 5, 2002, 56-58.
Far Ell, Jennifer, "Sensored Information" Wireless Computing, vol. 8, Issue 5, 2002, 135-136.
Lortz, John et al. "What is Bluetooth", Wireless Computing, vol, 8, Issue 5, 2002, 72-74.
Mahler, Jay, "PDAs Phone Home", Wireless Computing, vol. 8, Issue 5, 2002, 33-36.
Nelson, Tom, et al., "The Other Guys", Wireless Computing, vol. 8, Issue 5, 2002, 18-20.
Nelson, Tom, et al. "Wireless PDA Honor Roll", Wireless Computing, vol. 8, Issue 5, 2002, 15-17.
Perry, Christian, "Converging Technologies", Wireless Computing, vol. 8, Issue 5, 2002, 5-9.
Perry, Christian, "The Handheld Internet". Wireless Computing, vol. 8, Issue 5, 2002, 29-32.
Perry, Christian, "What's the Big Deal with Going Wireless?", Computing, vol. 8, Issue 5, 2002, 13-14.
Phelps, Alan, "GPS Receivers & PDAs Join Forces", Wireless Computing, vol. 8, Issue 5, 2002, 21-24.
Rowling, Rebecca, "PDA Video", Wireless Computing, vol. 8, Issue 5, 2002, 19-122.
Smith, Steven, *"Palm* v. *Pocket PC",* Wireless Computing, vol. 8, Issue 5, 2002, 10-12.

\* cited by examiner

ACCESSING REMOTE SYSTEMS USING IMAGE CONTENT

RELATED APPLICATIONS

This application claims priority to and is a continuation of U.S. application Ser. No. 12/775,980, filed May 7, 2010, which is a continuation of U.S. application Ser. No. 11/556,430, filed Nov. 3, 2006, issued as U.S. Pat. No. 7,725,360, which is a continuation of U.S. patent application Ser. No. 09/606,350 filed Jun. 29, 2000, issued as U.S. Pat. No. 7,133,837, all of which are hereby incorporated by reference in their entireties.

TECHNICAL FIELD

The present disclosure generally relates to devices and methods for providing personal communications including handheld mobile telephones.

BACKGROUND

The present disclosure relates to a system for providing transmissions relating to broadcast transmissions and methods of customizing and presenting the broadcast content in the form of audio, video, and text, to a viewer (i.e., a person). Until recently, radio and television were the two most common forms of presenting audio or audio and video to a viewer. However, in recent years, electronic transmissions over the Internet have become more and more widely used as a medium for presenting information to a viewer.

Television and traditional AM and FM band radio transmissions are unidirectional broadcasts of a one-to-many point transmission scheme. Most cable television stations and some digital television broadcasting companies include a unidirectional broadcast that can be viewed only by selected recipients. For example, viewers who subscribe to certain pay channels such as Showtime or Cinemax are able to view those channels, while viewers who do not subscribe to those channels cannot view those channels. In addition, viewers who desire to purchase a pay-per-view movie can telephone the broadcasting service (or through some other means indicate their desire) to purchase the movie and only those purchasers can view the movie. However, besides indicated the desire to purchase the movie or subscribe to a channel, viewers have few communications to the broadcaster and have very little control over the received information, the format and/or perspectives of viewing the information transmitted, the time of viewing, etc. In addition, traditional television and radio broadcasters transmit the same advertisements to all viewers irrespective as to the whether a viewer is likely to be a candidate interested in the advertised product.

The Internet provides a medium of communication that allows more bi-directional communication than previously available with traditional television and radio. For example, a viewer can select which web page to view from a selection of web pages and can view them in any order. When the broadcaster of the web page has implemented dynamic web pages, the viewer can also customize the web page to his or her preferences. For example, a web page can be retrieved that displays the viewer's stock portfolio. Since different viewers typically invest in different stocks, the web pages for different viewers vary accordingly. Thus, dynamic web pages have the capability of producing web pages that differ from viewer to viewer.

Chat rooms have also become increasingly popular as a forum for people of common interest to communicate by typing messages that are visible to other participants in the chat room in real-time. However, the information accessible to a potential participant of the chat room is usually limited to the participants' usernames (or screen names) and the title of the chat room. Similarly, email, list servers, and newsgroups have become other common methods of communication.

Direct marketing in the form of electronic transmissions (such as email or fax) is often used to invite participants to receive a broadcast of an auction, video presentation, a web site, or to get people to buy a product or service. Typically, the email addresses (or fax numbers) of a group of people who have a common interest (such as horse lovers, business opportunity seeks, investors, etc.) are rented or purchased from an email vender. The purchaser (or a bulk mail or fax service) will then email (or fax) an offer to all of the email addresses (or fax numbers) in hopes that at least a small percentage will respond favorably to the advertisement by purchasing the service or product or otherwise responding to the advertisement (e.g., by visiting the advertised web site). However, if the recipient of the transmission is not interested in the content of the transmission (e.g., the advertised product), the recipient will typically simply delete the email or discard the fax.

Print advertisements are also used to drive traffic to web sites. Often, however, the person reading the print ad is not also operating a computer to allow the individual to immediately access the web site if the individual desired to do so. Portable digital voice recorders have been developed that record a persons voice, which is stored for later retrieval. The most common use of voice recorders is to alleviate the need to write down information that the user wishes to remember. However, the user recording the voice message, or someone else, must still transcribe the voice message (e.g., web address or desire to purchase a product) and input that information manually into a web browser.

Many people enjoy gambling even though most people do no live near gambling establishments and people often travel great distances to participate in gambling. One alternative is online gaming, which is performed through software. Specifically, a computer program generates the order of cards in a virtual deck of cards that the user plays. The virtual cards are typically displayed in graphic form on the user's display. The computer generation of the virtual deck of cards and order of the cards (or other gaming device such as dice or roulette) is not, by many people, considered to be trustworthy and fair. In other words, many people do not trust virtual gaming in which a computer controls the device of chance (e.g., dice, cards, or roulette) and as a result, virtual gaming to date has only received limited acceptance in the general public.

DETAILED DESCRIPTION OF EMBODIMENTS

Figure 1:
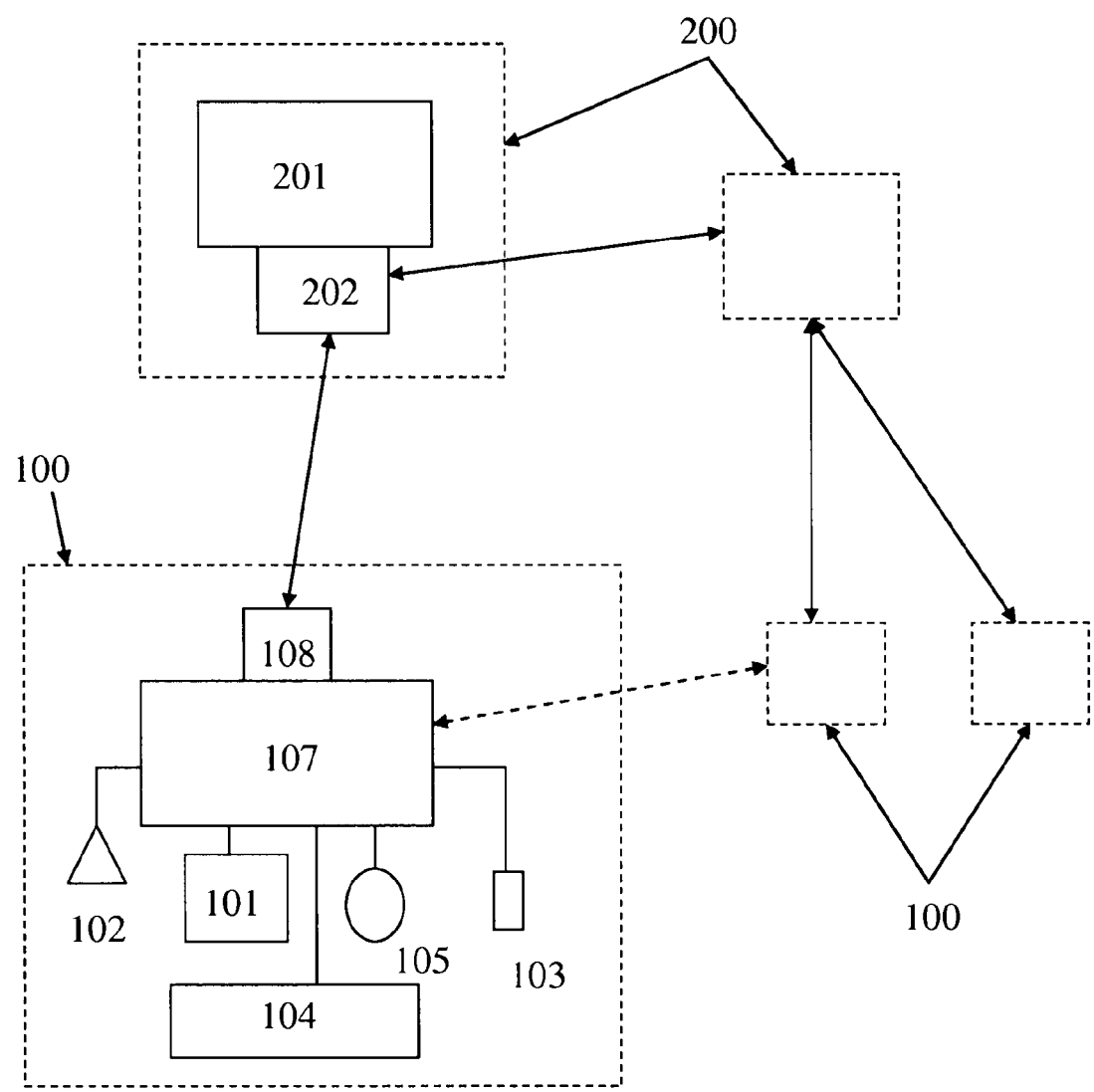
FIG. 1 is a schematic representation of a plurality of viewing stations and broadcast stations.

Unless the context of its use suggests otherwise, throughout this document the term "viewing" is meant to include seeing the video and hearing the audio of a broadcast, where both the video and audio portions of the broadcast are available. Unless evident from the context of its use, "video" throughout this document is meant to refer to the display of moving images as opposed to a still photograph. In general, the term "broadcaster" is used throughout this document to mean the entity operating the broadcast station and who transmits broadcast transmissions through the use of the broadcast station.

The present disclosure is directed to a handheld communication device and method of use. In one embodiment, the method of using a handheld mobile telephone includes capturing a plurality of images via an image input device; storing the plurality of images in a memory, receiving a first speech input, identifying command information in said first speech input; retrieving information from memory based, at least in part, on the command information. The method may further include generating a request related to an article of commerce that includes, at least in part, the information retrieved from memory, determining a destination for transmitting the request, and wirelessly transmitting said request through a mobile telephone network to the destination.

According to another embodiment, incentives are paid to persons for distributing an electronic transmission to others. For example, by keeping track of the recipients to whom participants forward transmissions, so that participants can be compensated with promised incentives, recipients are thereby provided incentive to forward the transmission to others. Thus, by providing an incentive to recipients to forward the electronic transmission containing an advertisement, the advertisement can be distributed to a much larger audience than could otherwise be accomplished without additional up front expense.

According to yet another embodiment, a person stores voice controlled commands, which are later retrieved by a computer that then exercises the stored commands. In one example, a voice recorder having commands stored thereon is placed in a docking station, which causes the software on the associated computer to retrieve the stored voice messages, convert them to text, and carry out the stored commands (e.g., buy golf clubs at golf.com). Alternately, a handheld scanner may be used to store the text representing the web address for later retrieval and use with a voice command.

According to yet another embodiment, the content and format of the audio, and video is customized as desired by the viewer. For example, after selecting a sporting event, the viewer can select a desired camera perspective, or a number of camera perspectives. The viewer may also select the desired audio, which might be selected from a choice of different sets of commentators, music, or an unrelated audio broadcast. In addition, the viewer may select an informational transmission containing information for wagering on the event, statistics relating to the event, or for competing against other viewers of the event. Finally, the viewer can store portions or all of the broadcast for later viewing, for slow motion instant replay, and/or for modifying.

According to still another embodiment, viewers customize the content of a transmission. For example, viewers can receive an entertainment video broadcast (e.g., a movie or a live play) in digital form—for either live viewing or on-demand viewing—in which the movie is modified from its original form by the viewer. A parent might, for example, wish to remove or replace the profanity from the audio portion of the movie or violence from the audio and video portions of the transmission so that it is more suitable for younger viewers. Alternately, the broadcaster may modify (e.g., remove or replace obscene language or violent video) the transmission according the requests provided by specific viewers.

According to yet another embodiment, a viewer provides feedback to a broadcaster about the broadcast (whether it be a movie, commercial, educational or other type of broadcast) by answering appropriate questions. The questions may be viewed by the viewer at the end of the broadcast or at particular points throughout the broadcast. The broadcaster may also obtain viewer reactions to broadcasts through the use of biofeedback devices that monitor the viewer's physical response (e.g., blood pressure, skin resistivity, heart rate, etc.) to the broadcast.

According to still another embodiment, a viewer selects a broadcast or portion of a broadcast for viewing. For example, a seminar is transmitted to multiple viewers who have purchased the reception of the seminar. The audio and video are transmitted with a text version of the audio or, alternately, the audio portion is converted to text through the use of voice recognition software. The text portion is indexed to the video or audio (either by the broadcaster, the creator of the programming, or the voice recognition software) and provides a number of benefits to the viewer. For example, the viewer can later search the broadcast for particular words spoken by the seminar instructor to immediately find and view the portions of the seminar that address a subject of interest. The text version is also available for reading (either from a display or in printed form) and for use in other documents. Alternately, the broadcaster can search for broadcast transmissions according to a viewer's broadcast requests.

According to yet another embodiment, a system allows people to remotely gamble with a real device of chance. For example, the viewer can see the game of chance and interact with the gaming employees and other players as if the viewer were actually in a gaming establishment.

According to still another embodiment, a virtual room is provided for viewers to meet and discuss topics of common interest. For example, in one embodiment, the viewer's display depicts a virtual room, which contains representations of other viewers who are present in the virtual room. Viewers may congregate in groups within the room to discuss subtopics of interest. Once in the room, the viewer may gather information about individuals in each group in the virtual room before entering a particular discussion.

As shown in FIG. 1, a system according to one embodiment comprises at least one viewing station 100 and one broadcast station 200 communicatively coupled together. In the preferred embodiment, the viewing station 100 is a conventional "personal" home computer (e.g., a PC Windows machine) comprised of a monitor 101, microphone 103, speakers 102, central processing unit (CPU) 107, keyboard 104, mouse 105, and Digital Subscriber Line (DSL) modem 108. In alternate embodiments, viewing station 100 may include a subset of these components or other components. For example, viewing station 100 could easily include a cable modem or other kind of communication device instead of DSL modem 108.

The software of the viewing station 100 includes a conventional operating system including a Graphic User Interface (GUI). In the preferred embodiment, the operating system is Windows 2000, which interfaces with (or includes) an internet browser—Internet Explorer. The software also includes audio-video presentation software, which in the preferred embodiment includes both RealPlayer and Windows Media Player.

Again, the selection of the particular software and the parsing of tasks between software modules is the designer's choice and dependent upon many considerations such as the format of the transmitted broadcast, cost, compatibility with other components, etc. An alternate embodiment of the viewing station might comprise the well-known WEB TV (provided the processing power required for the application permitted)—in which a television acts as the monitor and speakers of the viewing station.

The broadcast station 200 can be any station capable of communicating with the viewing station(s) of the system and that has the necessary processing (computing) capabilities, which will be evident to one skilled in the art. The broadcast station 200 may, but does not necessarily, originate the broadcast. The broadcast station 200 may receive and rebroadcast transmissions that originated from other broadcast stations or, the broadcast station 200 can receive and record broadcasts that are transmitted by other broadcast stations and then retransmit the broadcast at a later time.

In the preferred embodiment, the broadcast station 200 is a web server 201, which is a computer that accepts requests for data (e.g., web pages) over the Internet and responds by transmitting the data. The server 201 also performs various functions (e.g., storing data in a database, performing calculations) depending on the software associated with the various web pages of the web sites that it serves (i.e., depending on the application and purpose of the web page). In addition, the server 201 of the preferred embodiment includes streaming video capability.

In the preferred embodiment, the web server 201 is an Intel microprocessor based computer running Windows NT and Microsoft's Internet Information Server using Hyper Text Transport Protocol (HTTP)—which operates on top of the Transmission Control Protocol (TCP).

In the preferred embodiment, the web server 201 also includes streaming video software and software for storing compressed audio and video files into a single media file (e.g., compressed for delivery over a specific bandwidth such as 56 kilobits per second (Kbps)) on a standard web server. Although the use of streaming video is well-known in the art, a Web page containing a link (i.e., the URL) to the media file is placed on the same Web server. When this web page is accessed, the client-side player (i.e., the viewing station software) downloads the media file. After a short buffering period, the viewing station begins "playing" the media file. This "progressive playback" is supported by Microsoft's Advanced Streaming Format.

In the preferred embodiment, the media file is copied to a specialized streaming media server such as Microsoft Windows Media Services and a web page with a link to the media file is placed on the web server 201 (which may or may not be on the same computer). This embodiment may use the popular HTTP/TCP protocols as well as the User Datagram Protocol (UDP) for faster real-time transmission of audio and video data. The data is viewed by using Windows Media Player at the viewing station. Windows Media Server also has Multicast Support to greatly reduce the bandwidth necessary to broadcast to a plurality of viewers. This transmission technique is used in the applications described in which the viewer does not need to process the transmission, because the transmission of the Windows Media Server is immediately directed to the viewing station player (software). For applications in which the viewer needs to process the transmission, transmissions formatted for use with RealPlayer, or any video/audio presentation software that permits storage of the transmission on the viewer's viewing station, is used. These various software programs are well-known in the art and the details of their operation, compatibility with other software, viable applications, and capabilities are thus omitted here.

The transmission to the viewing station(s) can be accomplished with software on the server computer or a separate computer, which is used in tandem with the server computer to transmit the streaming video to viewing stations. The broadcast station 200 also includes a receiving and transmission device 202 (e.g., an Ethernet card). In general, the broadcast station 200 includes server software that is capable of selectively communicating (receiving and transmitting text, HTML, video and audio transmissions) with a plurality of viewing stations.

Alternately, the broadcaster could broadcast rf transmissions (e.g., radio), optical transmissions, satellite transmissions, cellular, or some combination thereof. The format, bandwidth, wavelength and other broadcast parameters are parameters selectable by the designer of the system based on the costs, compatibility with viewers, and benefits of each choice given the application.

The modem 108 of the viewing station 100 is capable of receiving transmissions from the broadcast station 200 and, through the appropriate software, converts the received data to information that is usable to the viewer. In the preferred embodiment, the modem 108 is a DSL modem. However, provided the speed of such devices is adequate for the application's broadcast transmission rate, a designer could also elect to communicate over a regular 56K modem, a cable modem, or an ISDN line. In summary, the viewing station 100 is coupled to the broadcast station 200 for bi-directional communication (receiving and transmitting text, HTML, video and audio transmissions) and includes conventional software for presenting the received transmissions to the viewer.

Direct marketing in the form of electronic transmissions (such as email or fax) is often used to get participants to an auction, video conference, a web site, or to get people to buy a product or service. Typically, the email addresses (or fax numbers) of a group of people who have a common interest (such as horse lovers, business opportunity seekers, investors, etc.) are rented or purchased from an email vender. The purchaser (or a bulk mail or fax service) will then email (or fax) an offer to all of the email addresses (or fax numbers) in hopes that at least a small percentage will respond favorably to the advertisement by purchasing the service or product or otherwise responding to the advertisement (e.g., by visiting the advertised web site).

One problem with this approach is that many recipients of the advertisement become irritated or enraged by being "spammed" by the unwanted email (or fax). Another option is opt-in email address lists, which are supposed to include only email addresses of people who have agreed to receive email advertisements. Opt-in email address lists, however, are rather expensive—sometimes prohibitively so.

In either case, if the recipient of the transmission containing the advertisement is not interested in the service or product (hereinafter collectively referred to as "product"), the recipient will typically simply delete the email or discard the fax. The following example uses email as the form of electronic transmission, but the present embodiment would be equally applicable to fax transmissions, or even voice transmissions (e.g., voice mail), as well, with appropriate modifications to the processing software that would be clear to one skilled in the art.

By providing an incentive for recipients to forward the electronic transmission, the advertisement can be distributed to a much larger audience, without additional up front expense. The most widely accepted incentive is a financial incentive. However, unless the price of the product is extremely high, it would be difficult to provide compensation that is sizeable enough to motivate someone to take action to forward the advertisement. In other words, if, for example, a person is promised $50 for every person to whom they forward the email and who responds to the advertisement, their income is limited the number of people to whom they know and forward the email.

By using the principle of multi-level marketing, however, greater financial incentives can be provided. For example, if the person is promised $10 for every person to whom they forward the email and who responds to the advertisement and $10 for each person to whom their recipients forward the email and who responds to the advertisement, there potential income is much greater. Thus, through the principle of multi-level marketing, a person may forward the transmission to only ten people, but might earn thousands of dollars due to the efforts of those to whom the person forwarded the transmission. Although this is not likely to be the case, this possibility provides incentive for people to forward the transmission, while if their income was limited to their own efforts, they might not forward the transmission.

Figure 2:
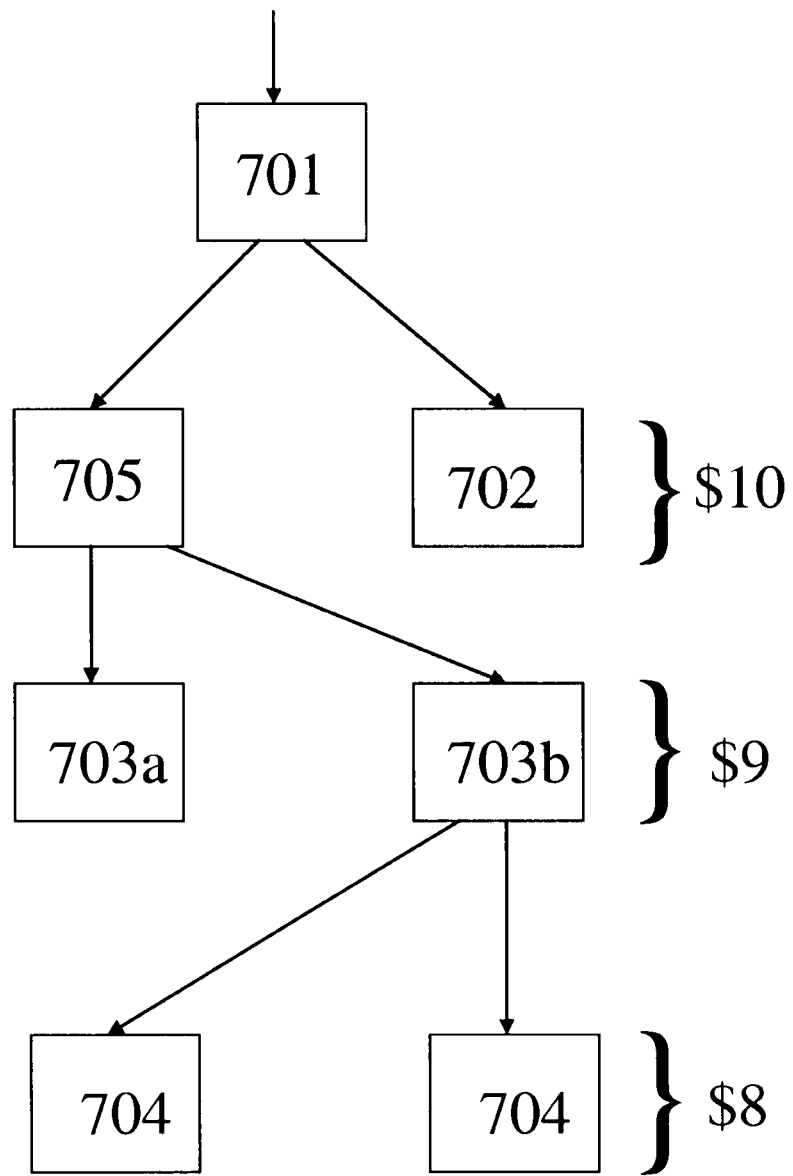
FIG. 2 is schematic representation depicting the flow of an example electronic transmission.

This concept is shown in FIG. 2. For example, a person 701 who receives an email containing the advertisement receives $10 for each person to whom they forward the email and who responds to the advertisement 702 (a person who responds to the transmission is hereinafter referred to as a "respondent"). In other words, the transmitter 701 receives $10 for each first level respondent 702. In addition, that transmitter 701 receives $9 for each person that responds 703 to an advertisement in an email from one of the recipients 705 to whom the transmitter 701 forwarded the advertisements. In other words, the transmitter 701 receives $9 for each second level respondent 703. Furthermore, the transmitter 701 receives $8 for each person that responds 704 to the advertisement in an email forwarded from one of the transmitter's recipients' recipients 703. In other words, the transmitter 701 receives $8 for each third level respondent 704. In this example, transmitter 701 forwarded the email to only two people, but earned commissions of $46, $26 dollars of which is the result of the transmitter's 701 first level recipients (702 and 705) forwarding the email to others. A respondent may or may not also forward the transmission and any recipient may or may not also be a respondent. As an illustration, recipient 705 forwarded the transmission, but need not have been a respondent (but was in the above example). Recipient 703a was a respondent, but did not forward the transmission. Recipient 703b was a respondent who did forward the transmission.

The number of levels of respondents for which an incentive is promised (and thus, the levels deep from which participants receive commissions) is at the discretion of the promoter executing the marketing program and the software designer. Thus, one goal is to facilitate the payment of incentives by keeping track of the recipients to whom participants forward the advertisement so that they can be compensated with the promised incentives, thereby providing incentive for recipients to forward the transmission to others.

In the following example embodiment, the electronic transmissions are emails and the vender is interested in selling an investment newsletter at an annual subscription price of $300. The promoter is paid $50 for each respondent that subscribes to the newsletter, of which up to $40 is paid to recipients for forwarding the transmission (and advertisement) to someone who ultimately subscribes to the newsletter (i.e., responds). On behalf of the vender, the promoter transmits ten thousand emails to persons known to be interested in investing and who have agreed to accept emails advertising investment products (opt-in email addresses). The email address of the ten thousand original recipients is stored on the email processing computer of the promoter, which is in this example (but does not need to be) the same computer that transmitted the emails. The email processing computer in this example is a broadcast station 200 as described above.

The email includes two parts. The first part includes the advertisement for the newsletter, which provides a description of the newsletter, the benefits provided by the newsletter, and the web address (URL) for finding more information about newsletter and where the recipient may purchase the newsletter. In this example, this part of the email reads:

"Would you like to increase your investment earnings while reducing your risk? If you would like to learn how, without risk, read on! Our Investor's Newsletter is guaranteed with a 100%, money back, no-questions-asked, guarantee. To learn more or to subscribe, go to www.EarnAndInvest.com."

A second part (the next portion of the body) of the email includes an incentive for forwarding the email to others. More specifically, the second part includes a description of the incentive, instructions for participating, and the web address where recipients can get more information about the promotion. In this example, this part of the email reads:

"Would you like to earn money by simply forwarding emails? No sign-up, no money required!! Simply forward this email to all of your friends and "cc" us at Newsletter@thunderboltpromotions.com. We'll keep track of everyone you forward this promotion to. You'll get $10 for every person who subscribes to the newsletter and is in the chain of emails in which you forwarded the advertisement and is within four email transmissions of you (i.e., four emails deep). When the program is over (on July 15), we'll email you to tell you how much you earned so you can give us your name and address to receive your check. For more information about this promotion, visit our site at www.thunderboltpromotions.com."

Thus, each of the ten thousand original recipients receives this two-part email. Some of these recipients visit the vender's web site to subscribe to the newsletter, and therefore become a "respondent" to the advertisement. Some of these recipients forward the email to others in hopes of receiving the financial incentive. Some of the recipients do both (become a respondent and forward the advertisement). The original recipients (and future recipients) that do forward the email, cc the email (i.e., transmit a copy of the email) to the email address of newsletter@thunderboltpromotions.com, which is a transmission certification receptor. As discussed below, the promoter can then access the transmission certification receptor (i.e., access the email server receiving the email sent to newsletter@thunderboltpromotions.com) to determine the email addresses of the transmitters and recipients of the email carrying the advertisement. In the present embodiment, the transmission certification receptor is an email address resident on the email processing computer, which acts as the email server as well. However, the transmission certification receptor could be an email address on any email server in which the emails are retrievable by the email processing computer.

Each person who subscribes to the advertisement (i.e., each respondent) is asked to supply the email address at which the respondent received the advertisement. The vender then periodically provides the email addresses of the respondents to the promoter. In the present embodiment, the vender gives the promoter the email addresses of all new subscribers (respondents) on a weekly basis. This information is stored by the promoter on the email processing computer in a database table called RESPONDENTS.

The email processing computer will routinely access the emails that are received at the transmission certification receptor (newsletter@thunderboltpromotions.com) and identify the email address of the sender of the email (hereinafter the "transmitter") and identify all the email addresses of the corresponding recipients (hereinafter "recipients") of the email. In the present embodiment, this is done hourly. The emails are processed in the order in which they are received at the transmission certification receptor (newsletter@thunderboltpromotions.com). In this embodiment, the initial processing also parses the subject line to ensure that particular words are present, such as the word "newsletter" in this example. Emails that do not include the proper word or phrase in the subject line are not processed and are deleted or stored for other use as decided by the promoter. Alternately, the initial processing could parse the body of the transmission (the body of the email in this example) to identify particular words or phrases or the time of transmission (or reception by others), or not parse the body or subject line at all.

The initial processing results in information being stored in the EMAIL table of the database that includes (for each email) an index number for the email received at newsletter@thunderboltpromotions.com, the email address of the transmitter of that email, and the email addresses of all of the corresponding recipients of that email. Each email that is processed is assigned an incrementally higher index number. Emails with higher index numbers are then known to have been received later than emails with lower index numbers.

As previously discussed, the email processing computer in this embodiment includes the same components as the broadcast station 200 described above, and may also function as a broadcast station. The processing software in the present embodiment is written in Microsoft Visual Basic that accesses a Microsoft SQL database (a relational database). In addition, the Visual Basic software uses a Visual Basic Component, which in this embodiment is Microsoft MAPI (Messaging Application Programming Interface) Component, to communicate with the email server acting as the transmission certification receptor. The initial processing software retrieves the sender field of the email to identify the email address of the transmitter. Likewise, the software retrieves the recipients field of the email to identify the email addresses of the recipients. Similarly, if the subject line is being parsed, the software retrieves the subject field of the email for parsing. Other information, as is deemed necessary by the designer or promoter, can be discerned from other fields, the body or the trailer of the email as well.

Further details of extracting information from emails (both the body of the email, addresses and the subject line) and other transmissions are well-known in the art and are not repeated here. The particular method used to extract the information from the transmissions are left to the designer, who will make the election based on the programming language, the operating system, the transmission system, the speed of the CPU, costs, and other factors.

Periodically, and in the present embodiment coinciding with the arrival of the list of respondents from the vender, the secondary processing is performed by the email processing computer. The goal of the secondary processing is to identify each of the respondents as a recipient and to identify the transmitters (i.e., email addresses of persons) who transmitted the email advertisement eventually received by that recipient and who are to be compensated with the promised incentives.

Figure 3A:
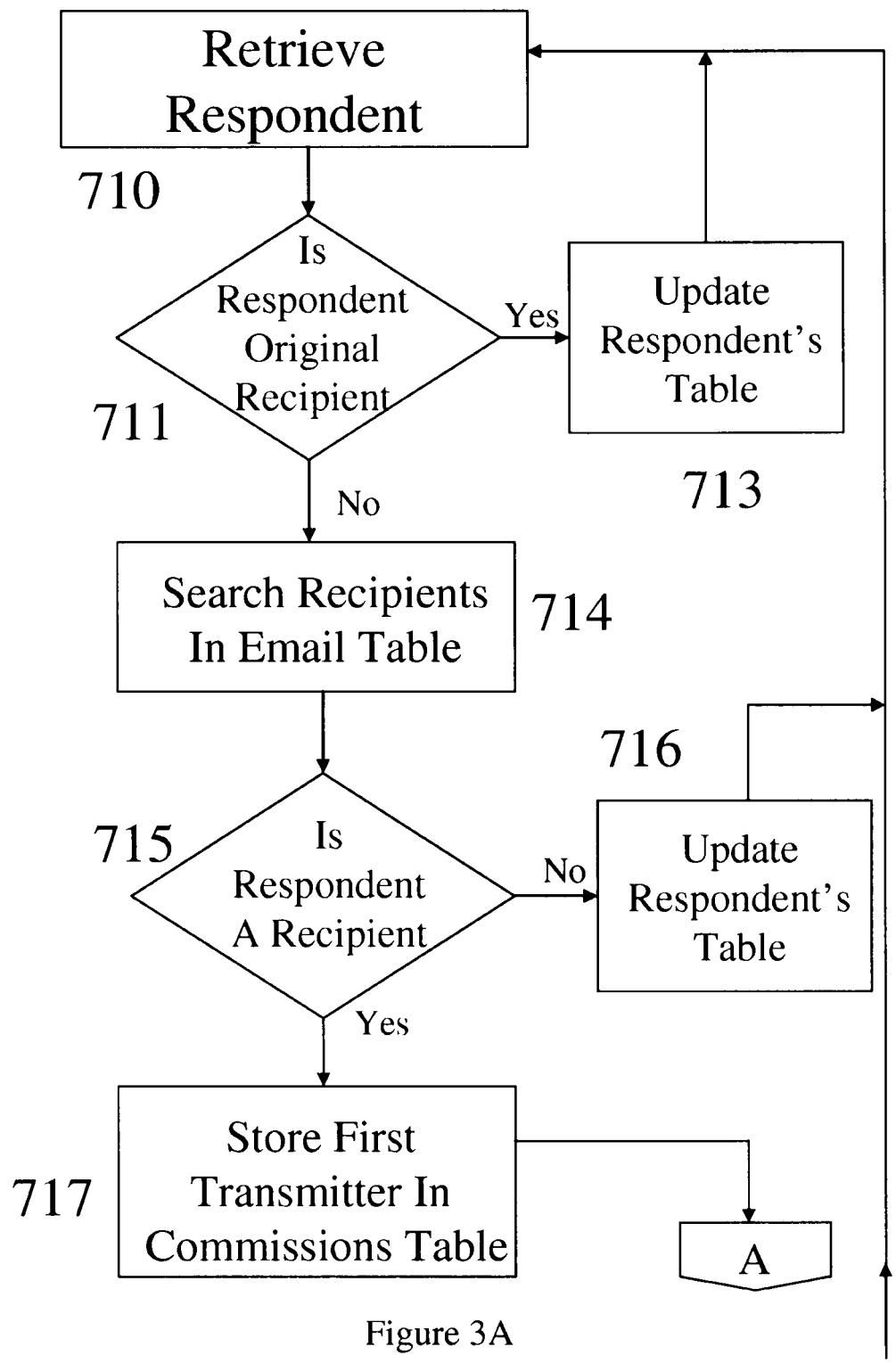
FIGS. 3A-3B is a flow chart diagram of the steps for identifying respondents as recipients and recipients as transmitters.
Figure 3B:
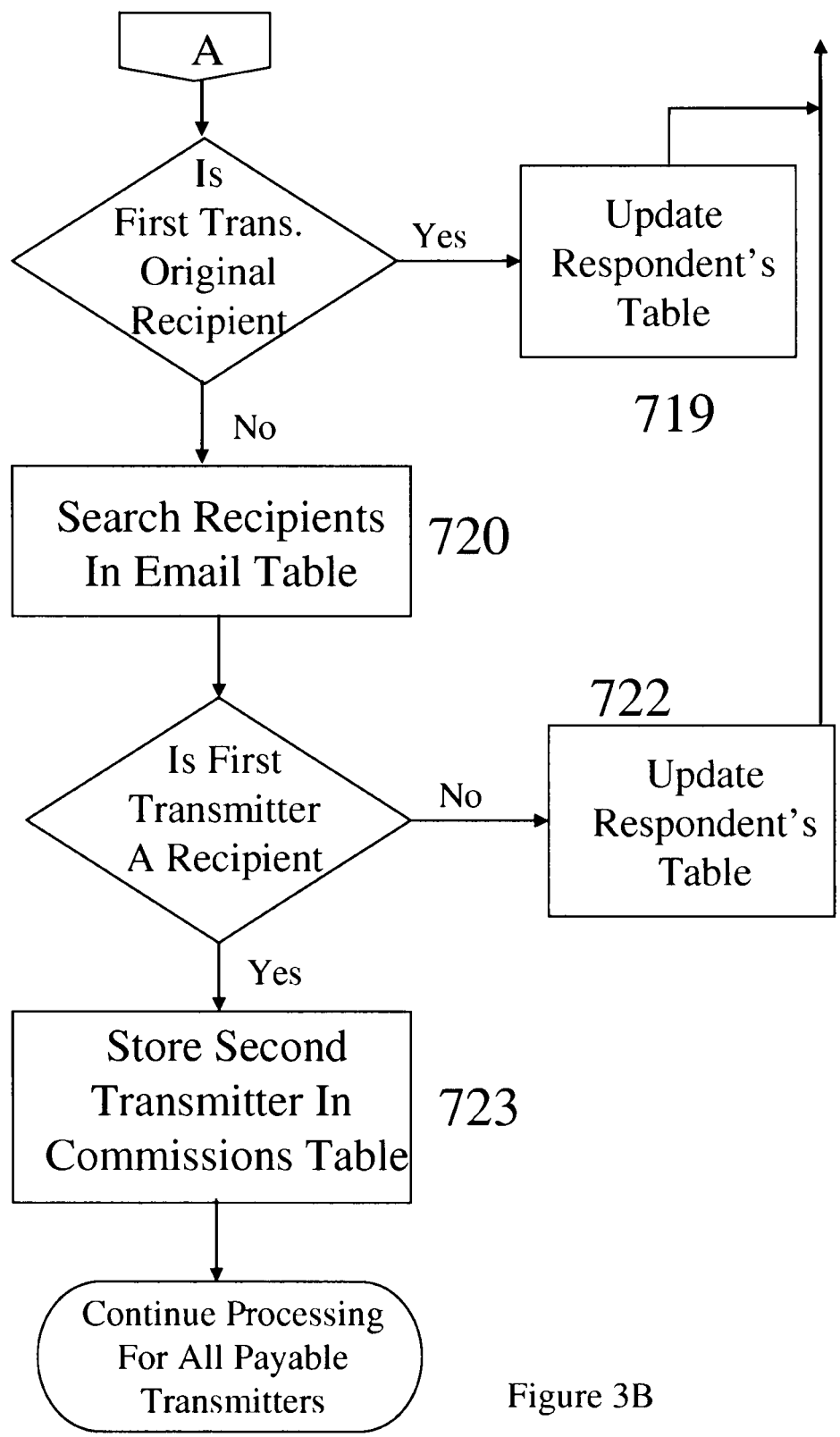

Referring to FIGS. 3A-B, during the secondary processing, the email processing computer retrieves a respondent email address from memory 710 and searches the original recipients to determine if the respondent was one of the original ten thousand recipients 711. If the respondent is identified as one of the original recipients, the RESPONDENTS table of the database is updated 713 to mark that respondent as being completed and identified as an original recipient and processing continues with the next respondent 710. If the respondent is not identified as an original recipient, the computer searches the recipients in the EMAIL table 714 to identify the first email (i.e., by email index) that was received at the transmission certification receptor (newsletter@thunderboltpromotions.com) and in which the respondent was a recipient. In the present example, this is easily done by searching from lower email index numbers to higher index numbers. If there are no recipients that match the respondent, then that respondent record in the RESPONDENT table is updated 716 to indicate that no matching recipient was found and the secondary processing continues to the next respondent email address 710.

If a recipient email address matching the respondent email address is identified, the corresponding transmitter (the transmitter who forwarded the email to the respondent) (hereinafter referred to as "first transmitter") is also identified in the database because the first transmitter is the only transmitter associated with the same email index. The email address of the first transmitter is then stored 717 in a separate table (e.g., the COMMISSIONS table) in the database, along with the commission that the first transmitter is to receive for that respondent. In this case, a separate field in the table is used to store the value of the commission—$10.

Next, the goal of the secondary processing is to identify the email in which the first transmitter is a recipient. First, the original recipients are searched to determine if the first transmitter was one of the original ten thousand recipients. If the first transmitter is identified among the original recipients, the respondent in the RESPONDENTS table is marked completed 719 and the processing continues with the next respondent 710. If the first transmitter is not identified among the original recipients, the EMAIL table is searched 720 to identify the first email (i.e., by email index) that was received at newsletter@thunderboltpromotions.com and in which the first transmitter was a recipient. In the present example, this is easily done by searching from lower email index numbers to higher index numbers. If there are no recipients that match the first transmitter, then that respondent record in the RESPONDENT table is updated 722 to indicate that processing has been completed and the processing continues with the next respondent 710. Theoretically, this should not occur as all transmitters of the email should be either an original recipient or should have received the email from another transmitter. However, this could occur due to technical problems (e.g., the cc of the person forwarding the email to the first transmitter never reaching newsletter@thunderboltpromotions.com or the transmitter could have typed in a printed version of the email that the transmitter never received electronically).

If the first transmitter is identified as a recipient, the corresponding transmitter (the transmitter who forwarded the email to the first transmitter) (hereinafter referred to as "second transmitter") is also identified in the database because the second transmitter is the only transmitter associated with the same email index. The email address of the second transmitter is then stored 723 (e.g., in the COMMISSIONS table) in the database, along with the commission that the second transmitter is to receive for that respondent. In this case, the value of the commission of $10 is stored in the database and the processing continues with the next respondent 710.

Although not shown in the figures because the process is substantially the same as the process just described, the next goal of the secondary processing is to identify the email in which the second transmitter is a recipient. First, the original recipients are searched to determine if the second transmitter was one of the original recipients. If the second transmitter is identified among the original recipients, the respondent is marked completed in the RESPONDENTS table and processing continues with the next respondent. If the second transmitter is not identified among the original recipients, the EMAIL table is searched to identify the first email (i.e., by email index) that was received at newsletter@thunderboltpromotions.com and which the second transmitter was a recipient. In the present example, this is easily done by searching from lower email index numbers to higher index numbers. If there are no recipients that match the second transmitter, then that respondent record in the RESPONDENT table is updated to indicate that none were identified and that processing has been completed. The processing then continues with the next respondent.

If the second transmitter is identified as a recipient, the corresponding transmitter (the transmitter who forwarded the email to the second transmitter) (hereinafter referred to as "third transmitter") is also identified in the database because the third transmitter is the only transmitter associated with the same email index. The email address of the third transmitter is then stored (e.g., in the COMMISSIONS table) in the database, along with the commission that the third transmitter is to receive for that respondent. In this case, the value of the commission of $10 is stored in the database.

Next, the goal of the secondary processing is to identify the email in which the third transmitter is a recipient. First, the original recipients are searched to determine if the third transmitter was one of the original recipients. If the third transmitter is identified among the original recipients, the respondent is marked completed in the RESPONDENT table and the processing continues with the next respondent. If the third transmitter is not identified among the original recipients, the EMAIL table is searched to identify the first email (i.e., email index) that was received at newsletter@thunderboltpromotions.com and in which the third transmitter was a recipient. In the present example, this is easily done by searching from lower email index numbers to higher index numbers. If there are no recipients that match the third transmitter, then that respondent record in the RESPONDENT table is updated to indicate that none were identified and that processing has been completed for that respondent. The processing then continues with the next respondent.

If the third transmitter is identified as a recipient, the corresponding transmitter (the transmitter who forwarded the email to the third transmitter) (hereinafter referred to as "fourth transmitter") is also identified in the database because the fourth transmitter is the only transmitter associated with the same email index. The email address of the fourth transmitter is then stored (e.g., in the COMMISSIONS table) in the database, along with the commission that the fourth transmitter is to receive for that respondent. In this case, the value of the commission of $10 is stored in the database and processing continues with the next respondent.

In the present embodiment, the storage of the commission in the COMMISSIONS table is performed by first searching for the identified transmitter (first, second, third, and fourth) in the COMMISSIONS table. If that transmitter is found in the COMMISSIONS table, then the commission field in the table is simply increased by the amount of the currently calculated commission.

In an alternate embodiment, the identified transmitter and associated commission are simply appended to the end of the COMMISSIONS table. When secondary processing is complete, the table is then sorted on the transmitter field, commissions for duplicate transmitter records added, and duplicate transmitter records then deleted (except for one) leaving one record for each transmitter and the calculated total commission earned by that transmitter.

The secondary processing continues for each respondent for as many transmitters that are promised the incentive—in this case four transmitters. Although in the present example the secondary processing is performed weekly and coinciding with the receipt of new respondents, the secondary processing could be performed once, when the promotion is finished. Alternately, the secondary processing could be performed monthly or anytime that processing power is available and respondent email addresses are available for processing.

Periodically (or alternately when the advertising campaign is complete), the email processing computer will perform a transmission notification. In the present embodiment, this entails emailing each email address in the COMMISSIONS table to inform them that they have earned a commission. The email explains that the person has earned a commission and refers the person to the promoter's web site where the person may enter his or her name and address so that the promoter may forward the person a check for the commission earned (minus any administrative costs). Optionally, the transmission notification may include the amount of the commission earned or any other information deemed necessary by the promoter.

In the present embodiment, the commission for all identified transmitters (first, second, third, and four transmitters) is the same ($10). Because the commission is the same for each payable transmitter (first, second, third, and fourth transmitters), the amount of the commission does not necessarily need to be stored. The transmitter (i.e., transmitter's email) could be appended to the COMMISSIONS table by itself. Prior to the transmission notification, the processing software then counts the number of times each transmitter appears in the table and multiplies this number by the amount of the commission to determine the current earned commission for each transmitter.

The commission could also be a stepped commission. For example, first transmitters would receive $10, second transmitters would receive $9, and third transmitters would receive $8 as illustrated in FIG. 2. The commission structure is simply a design choice selected by the software designer and promoter and there are numerous alternative commission structures. The commission structure could be based on the number of recipients that receive the transmission so that, in the present example, the total commission value ($40) is split among the identified transmitters. If there is only one identified transmitter, then that transmitter receives the entire $40. If there are two identified transmitters, they each receive $20 and so on. Recipients could also be paid (e.g., 10 cents) for each person to whom they forward they transmission—irrespective of whether any recipients respond to the advertisement (in addition to, or instead of, being paid for downline respondents). Thus, over a month, a recipient would be paid for forwarding a number (e.g., ten) of different advertisements to others. In this example, the processing software determines which recipients have already received the transmission and does not credit the transmitter for recipients that have already received the transmission. Of course, the number of transmitters that are identified (and paid a commission) and the structure of the incentive is also the designer's and/or promoter's choice.

As an alternative to the example of the first embodiment, the vender's web site automatically provides the respondent information at the end of each day. This automatic supplying of the respondent email addresses automatically initiates the secondary processing by the email processing computer, provided initial processing is up to date (i.e., there is no back log of emails that need initial processing). Alternately, the vender could perform the functions of the promoter itself, in which case the email processing server and the vender's web site server are the same computer and secondary processing would take place each time a respondent responds.

In the example of the first disclosed embodiment, the email included only one advertisement. In practice, however, it may be advantageous to include multiple advertisements with the same (or optionally different) commission structure for each advertisement respondent.

In the first embodiment, before storing each recipient, the software may optionally search the previously stored recipients to determine if the recipient has already been identified as a recipient and stored during the initial processing of a previous transmission. If the recipient has already been stored as a recipient, the recipient is not stored again.

In the case of emails that have been forwarded, the body of each email will include the chain of transmitters who have received and then transmitted that email. In a second embodiment, the email processing computer performs the initial processing as described above with respect to the first embodiment, and also stores each email to be retrievable by the email index number. Once the secondary processing identifies the respondent as a recipient in the EMAIL table, the email having the email index of the corresponding recipient is retrieved. The secondary processing then parses that email (the body and/or trailer) to identify the transmitters that forwarded that email, which was eventually received by the respondent. Only the most recent transmitters that are due a commission (payable transmitters) need be identified—four in the first example. This embodiment allows the processing to identify the precise chain of emails and transmitters that led to the respondent receiving the transmission.

However, sometimes recipients may cut and paste the body of the email into a new blank email to alleviate the need for future recipients to have to scroll down through the non-substantive portion of the email (the transmitter email addresses, recipient email addresses, and email trailers). In this embodiment, when this occurs, processing terminates without identifying all transmitters who are to receive incentives.

In the first embodiment (FIG. 3), the stored transmitter and recipients of each email is used to reconstruct a chain of transmitters and recipients. However, some recipients may receive the transmission from multiple people and may not actually forward (transmit to others) the first email received, but instead forward the fourth email received. In the first embodiment (FIG. 3), the processing simply assigns the incentive (e.g. reward or commission) to the first person to transmit the transmission to the recipient, even if the recipient actually forwarded a subsequent email.

If necessary (as dictated by the application or desired by the promoter), the first and second embodiments may be combined to more accurately determine the actual transmitters that forwarded the email that eventually was received by a particular recipient. In such a combination, after the email index (and email) is found containing the respondent as a recipient, parsing of the entire email is the first step in identifying the actual transmitters (as described in the second embodiment). In those cases where a person had cut and paste the substantive portion of the email into a new email (and thus removes the identity of the previous recipients and transmitters from the email transmission), the software then resorts to the secondary processing of the first disclosed embodiment (of FIG. 3) to identify the transmitter who forwarded the email to the recipient (i.e., the transmitter of the email that had cut and paste the email content into a new email that was forwarded). The software in this third embodiment resorts to the secondary processing of the first embodiment when a transmitter of a transmission (e.g., email) cannot be identified as an original recipient.

Once the transmitter is identified as a recipient in an email (by searching the recipients), the processing retrieves the email received by that transmitter to determine if the actual chain of transmitters can be identified from the email. If the actual chain of transmitters cannot be found in an email, the processing looks at the time at which each transmitter forwarded the email to that recipient to thereby eliminate some of the transmitters and to determine which of the remaining transmitters' emails was the most likely to have been forwarded by that recipient. For example, if transmitter A transmitted the email to recipient B who immediately forwarded the email, transmitters who forwarded the email to recipient B after recipient B forwarded the email can be eliminated as being in the actual chain of emails that led to the respondent.

In the above disclosed embodiments, the respondent provides the email address at which he or she received the email with the advertisement to the vender. Instead, however, the respondent could be asked to provide the email address of a person who forwarded the respondent the email with the advertisement. This eliminates the first step in the secondary processing.

In another embodiment, the recipients do not forward the email to others. Instead, the recipient is instructed to reply to the presently received transmission and to include in the reply, the email addresses of all persons that the recipient wishes to receive the transmission (e.g., advertisement). The reply is received at the transmission certification receptor. Thus, in this fourth embodiment the recipients send only one email, which is transmitted to the transmission certification receptor. The content of this email includes all the email addresses of people that this person wishes to receive the transmission. Thus, instead of providing incentive for forwarding the transmission, this embodiment provides incentive to persons for providing email addresses to the promoter. The promoter then determines the transmitter of each email received at the transmission certification receptor (in the method described above) and parses the body of the email to identify all of the email addresses provided by that transmitter. The promoter's broadcaster station then transmits an email to all of the email addresses supplied by that recipient with an indication in the email that their email address was provided by that transmitter (e.g., "Your email was provided to us by john@company.com who thought you might find this email interesting."). Alternately, the email may not provide any indication as to who provided the promoter with the recipient's email address.

Because all emails are transmitted by the promoter and subsequently replied to, this embodiment allows the promoter to determine precisely who (which transmitter) caused the transmission to be transmitted to each recipient. This embodiment also allows each email address to be checked to determine if the email address has already received the advertisement transmission. The promoter may then elect to not resend the email advertisement to those recipients that have already received it.

Although one embodiment has been described in the context of transmitting an advertisement, other embodiments have other applications such as games of chance, competitions, as well as others.

Print advertisements are also used to drive traffic to web sites. Often, however, the person reading the print ad is not also in front of a computer to allow the individual to immediately access the web site if the individual desired to do so. Portable digital voice recorders have been developed that record a person's voice, which is stored for later retrieval. The most common use of voice recorders is to alleviate the need to write down information that the user wishes to remember.

Figure 4A:
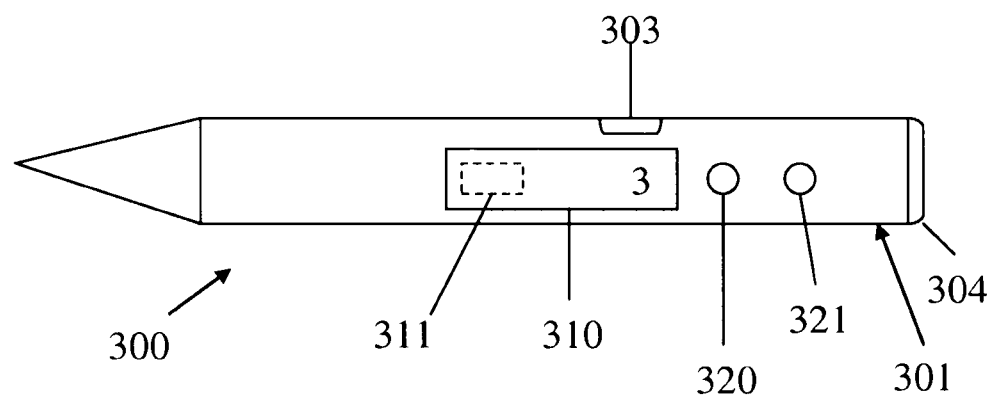
FIGS. 4A-4B are schematic representations of different embodiments of a command holder.
Figure 4B:
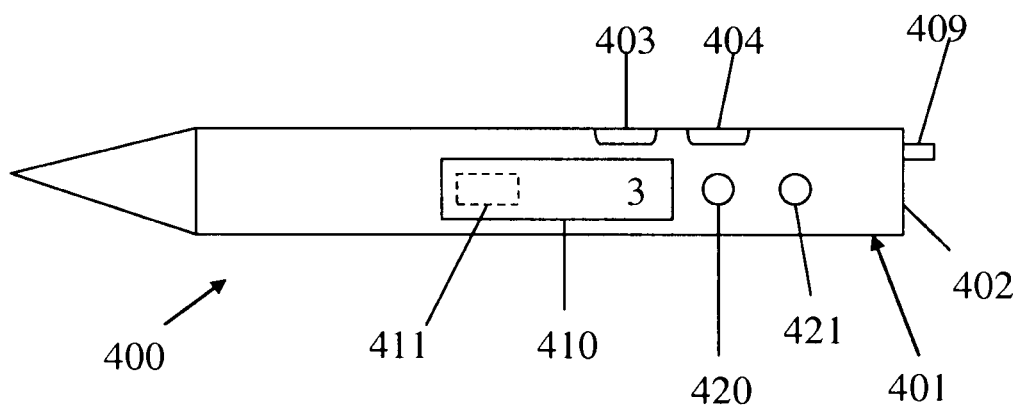

According to one embodiment, a voice recorder is integrated with a writing implement (i.e., ink pen) to form a command holder 300 as shown in FIG. 4A. One end of the instrument functions as an ink pen, while the other end 401 of the command holder functions as a microphone 304. During use, a user on an airplane may see a product in a gift magazine that the user wishes to buy for his father. The command holder allows the user to record the website address of the magazine advertisement and then record a relevant message such as "website, gifts.com, stop, buy product number 131323, golf club, for dad for father's day."

The audio input comprising a microphone 304 is located near the first end 301 of the command holder 300. An audio output comprising a miniature speaker 303 is located near the middle of the command holder 300. Similarly, near the middle of the command holder is an LCD 310 and two finger operable buttons 320, 321 that allows the user to perform various functions such as determining the number of messages stored, to delete (or overwrite) stored voice data.

In operation, the user identifies a print advertisement (or otherwise learns of a website address) that the user wishes to store so that the user may access the web site when convenient to the user. The user actuates the select button 320 until the microphone icon appears in the function area 311 of the LCD 310. The user then actuates the first button 321 and begins speaking into the microphone 304. To identify the voice data as a website, the user will first says the word "website" and pauses before speaking the website to be stored. This identifies the subsequent voice data as a web address to the processing software. The user then speaks the web address, (e.g., gifts.com\products\pn123242) into the microphone 304. If the user wishes to record a relevant voice message regarding the website, the user then speaks the word "stop" and then speaks the desired message into the microphone 304 (e.g., "buy golf clubs for dad"). When the user is done speaking into the microphone 304, the user de-actuates the first button 321 to terminate recording.

The voice recorder is designed and functions as a conventional recording voice that is adapted to be communicatively coupled with a computer as is discussed below. In general, however, the speech is processed through a filter, amplifier, an analog-to-digital converter, and stored in memory (e.g., RAM). The command holder 300 also has the capability of recording voice data that is not associated with a web address. To do so, the user actuates the select button 320 until the microphone icon appears and records the voice message as just described.

When not recording audio, the LCD 310 displays the number of voice recordings stored (shown as "3" in FIG. 4A). The user may then delete or overwrite previously stored data or listen to stored voice data. To scroll to a particular stored set of data, the user actuates the select button 320 until the scroll icon appears in the function area 311 of the display 310. The user then actuates the first button 321 until the data index (e.g., 5) of the stored data of interest is displayed on the LCD 310. The number one (i.e., 1) represents an empty storage location so that the user may record a new message without overwriting a previously stored message. When a new message is stored, the data indexes of all the messages (including the just stored message) are incremented, thus leaving data index one empty. When the data storage device is full to capacity, the LCD will not display a data index of one, thus indicating the storage device is full. Alternately, the command holder 300 may be designed so that the highest number is always an empty data index except when the command holder memory is full—at which time the LCD displays visual indicia indicating memory is full.

When the user gets to the data index of interest, the user may delete the voice message by actuating the select button until the delete icon ("X") appears in the function area 311 of the LCD 310. The user then actuates the first button 321 to delete the voice data. The user may also overwrite the voice data. To overwrite a voice message, the user actuates the select button 320 until the microphone icon is displayed in the function area 311 of the LCD 310 and then proceeds to record a voice message, as described above, at the data index containing the message to be overwritten. To listen to the voice message, the user actuates the select button 320 until the speaker icon is displayed and then actuates the first button 321. The recorded voice message is then audibly produced at speaker 303. Thus, the user may decide to re-record, delete, or retain voice messages according the methods described.

When the user wishes to access the data stored in the command holder 300, the user places the command holder in a docking station (not shown), which facilitates the command holder being communicatively and electrically coupled to the user's viewing station 100. Placing the command holder 300 in the docking station automatically triggers the start (execution) of the command software application that resides on the viewing station (hereinafter "command software"). The operation of the voice recorder and connection of the voice recorder to a computer through a docking station is well-known in the art. In addition, U.S. Pat. No. 6,038,199, to Pawlowski et al., which provides an example of implementing a voice recorder and connecting the voice recorder to a computer through a docking station, is hereby incorporated by reference.

The command software downloads all of the information from the command holder onto the viewing station memory device (e.g., hard drive). The voice data files are processed to determine the text that is stored in memory. The first step is accomplished through conventional voice recognition software, which converts spoken words into text (e.g., ASCII). Processing of voice through the use of voice recognition software is well-known in the art and the details thereof are not, therefore, repeated here. For example, ViaVoice Gold, a commercially available voice recognition software package by IBM, includes a speech navigator for Internet Explorer 4.0, as well as VoiceCenter, a Windows voice commander that launches applications and opens documents according to voice commands. In addition, U.S. Pat. No. 5,615,296 to Stanford et al., which provides an example of implementing speech recognition, is hereby incorporated by reference.

The output of the voice recognition software is a text version of the spoken words. Next, the command software parses the converted text to identify the word "website" and the word "stop." The text between the words "website" and "stop" are then identified to be a web page address and is stored in memory as such. Words stored in the same data index that follow the word "stop", if any, are stored as a voice message indexed to the identified web page address.

The command software automatically downloads and processes all of the voice data files and displays each web page address as a separate row (as text) in a column in the main menu on the viewing station display. For those data indexes that also include voice data, a the first seven words of the voice message are displayed as text and a sound icon is displayed next the text on the main menu. The first seven words of the voice message provide the user with a reminder as to the content of the entire voice message.

By using the viewing stations pointing device (e.g., the mouse), the user can click on the web address text (meaning actuate the appropriate actuator of the pointing device while the cursor of the pointing device is displayed over the web address), which will cause the command software to open the default web browser to access (transmit a request for) the web page that was stored and converted to the displayed text. Likewise, the user can click on the sound icon, which will cause the command software to audibly produce the voice data that was recorded at that data index.

In the present embodiment, the voice data is converted to text. However, in some circumstances, (e.g., when there is no stored website address), the voice data need not be converted to text, but is simply stored on the viewing station as voice data to be retrieved by the user. For example, if the command holder had a number of memory locations that were preselected for storage of web pages, the remaining storage locations would be known to be only voice and converting the data stored in those memory locations to text would not be necessary. In this alternate embodiment, the first seven words of the voice message are not displayed on the main menu.

The command software also has the capability to go a step further (at the option of the user), by converting the entire voice message to text and parsing the text for particular words. For example, after speaking the web address (and the word "stop") the user then speaks "buy, card corporate American express, delivery home, shipping normal." The command software parses this text, opens the default web browser to access the web address that was stored and converted to the displayed text—(e.g., www.gifts.com\products\pn123242). This web address is the web page that a person would access to purchase a particular product (but could be any information provided by a vender to allow the user to purchase a particular product). After the word "stop," the software identifies the word buy, which is recognized by the software to be the previously stored command to place an order. The next words are "card American Express," which identify which of the previously stored credit files (containing the appropriate credit card information such as credit card number, associated expiration date, billing address, and card name) to be used to make the purchase.

Portions of web pages that request information from user's are often referred to as forms. The beginning of a form in HTML can be recognized by the use of the "form" command (e.g., <form method="POST" action="http://www.e-mails.com/scripts/mailform.pl">). As is well-known to those skilled in the art, the text in quotes after the word "action" indicates where the form (i.e., the viewer's viewing station) will send the requested information. Information that is being transmitted to the processing web page (i.e., the web page that receives the form data) is transmitted along with the request for the web page. For example, the viewing station might transmit "http://www.emails.com/scripts/mailform.pl?clients_email=john@company.com" which passes the information "john@company.com" as the variable "clients_email" to the processing web page (http://www.e-mails.com/scripts/mailform.pl).

Most web forms are written in HTML and typically use the same HTML command (the input command, e.g., "<input name=user size=25 maxlength=25>") to prompt the viewer for data. Likewise, the forms often use the same or similar variable labels for each requested piece of information. For example, for the person's name, HTML forms often use the label NAME or Last_Name, First_Name, and Middle_Initial. For the address, the forms often use ADDRESS, CITY, STATE, COUNTRY, and ZIPCODE. The command software processes the web page and parses the web page for all the predetermined, stored labels that are used in common purchase forms. In other words, the command software looks for the input command on the web page and then determines the variable label to which the user's input would be assigned (e.g., "name=user" would indicate the variable is "user") to determine what information is to be supplied.

The command software then transmits the appropriate information for each variable label to the web page server (or broadcast station), thus emulating the user filling out the form and clicking on the Submit button. In instances in which the command software has been taught what information needs to be transmitted to a particular processing page, the command software may not need to request the web page containing a form. Instead, the command software simply transmits the necessary information to the processing web page.

The command software also parses the words "delivery home," which instructs the command software to use the user's home address (previously stored in memory) as the address for delivery. Finally, the command software parses the words "normal delivery," which instructs the command software to request normal (or standard) delivery of the purchased item(s).

Until an industry standard develops, the command software may have to be "trained" to interact with websites that have elaborate or unusual forms and/or which the user accesses frequently. For example, if a user often purchases books through Amazon.com, the user may wish to train the command software to interface with the Amazon.com web site. To train the command software the user accesses the website of Amazon.com and selects a product for purchase. Next, the user puts the command software in "watch" mode and provides user input indicating that the following information should be stored with a "buy book" command. The user then completes the forms to purchase the book and takes the command software out of the "watch" mode. The command software thus stores the number and address of the web page forms, the labels representing data that is requested by the web pages, the type of information that is supplied by the user (by comparing the information provided by the user (e.g., a credit card number) with the categories of user related stored information) and any other relevant necessary information. Subsequently, when the command software receives the "buy book" command, the software will complete the Amazon.com form(s) with a much greater likelihood of providing the correct information. The watch mode is especially applicable for use with websites that are frequently accessed such as for trading stock, making hotel, restaurant, or travel reservations, reserving golf tee times, and buying music, electronics, or books. Instead of actually accessing the forms, the software may (provided the web site is designed appropriately) simply send the required variable labels and associated information to the processing web page(s) that receives purchase information (e.g., http://www.golf.com/purchase.cfm?product=callowaydriver . . . )

Most user data is stored in the memory of the viewing station in categories that correspond to categories of data requested by web page forms. For example, the various credit card numbers of the user's credit cards are stored in the credit card category. Credit card expiration dates are similarly stored in the credit card expiration category. This method of storing the user's data allows the command software to determine (by identifying the category of data supplied by the user during watch mode) which category of information a particular variable label on a web page should be supplied with.

Thus, the command software does not limit the user to providing the particular data that was supplied during the watch mode.

The user may also (or optionally instead of) access the command software through the use of a cellular or standard telephone. The user simply calls his home at which time his viewing station 100 (or home computer) is programmed to answer telephone calls and act as an answering machine. Those skilled in the art are familiar with setting up a computer to act as an answering machine to store and retrieve voice messages and software for doing so is commercially available.

After the home computer answers the telephone call and begins producing the outgoing message (e.g., "thanks for calling, I'm not home right now . . . ") the user presses two predetermined keys (e.g., 1 and 2) on the key pad of the telephone. The home computer receives and recognizes the predetermined tones (resulting from the user pressing the two keys), stops producing the outgoing message, and awaits a command. The user then speaks the message to the computer, which as described above is "website, gifts.com\products\pn123242, stop, buy, card corporate American Express, delivery home, shipping normal." The user may then hang up, or press another predetermined key (e.g., 3) to have the command software process the website address and command, at which time, the command software will audibly produce the converted web page address and command to the user. If the user wishes to place another command, the user presses still another predetermined key (e.g., 4) and begins speaking the next message (e.g., a web page address and command).

Upon receiving the telephone call, the command software stores the entire spoken message in memory for processing. If the user presses the second predetermined key, the software begins processing immediately. As previously discussed, the voice message is converted to text through the use of voice recognition software, which is well-known in the art. The command software then performs the parsing as described above, to parse out the web page address and the command. By using appropriate voice synthesis software, the command software then audibly produces (meaning transmits over the telephone connection for audible reception by the user) the word "website" followed by the web page address converted from the stored voice data (e.g., "gifts.com\products\pn123242"). The command holder then audibly produces the word "command" followed by the interpreted command (i.e., the command converted from the stored voice data) in this example "buy, card corporate American Express, delivery home, shipping normal."

If the user determines that the command software has correctly interpreted the command the user may hang up or presses another predetermined key (e.g., 5) to indicate that the voice message has been correctly interpreted.

In addition to providing information to make purchases, the telephone may also be used to receive information. For example, the user may ask the command software to read emails or get the next days forecast. The user may put the command software in "watch" mode and input information into the command software that the user inputs are for retrieving email (i.e., for the "email" command). After the user opens all of the emails, the user then takes the command software out of the "watch" mode. The command software then stores all of the user inputs (e.g., usernames, passwords, mailboxes, etc.) used by the user to access the emails.

When the command software accesses the emails as a result of the email command, the software audibly produces (for audible reception by the user) the subject line of the email and the transmitter of the email followed by the body of the email. The user can press predetermined keys on the telephone to delete, save, reply to, or forward (followed by speaking the email address of the recipients) the email.

Likewise, the watch mode can be used to teach the command software to access a particular web page, retrieve certain information, and audibly produce that information to the user. For example, during watch mode for retrieval of a forecast, the user accesses a particular website and highlights a particular phrase (such as "tomorrow's forecast") and provides input instructing the command software to store that phrase as the web page trigger. The user next highlights the next phrase(s) and provides user input instructing the command software to store the highlighted phrase as the site content text to be retrieved and produced to the user when the user provides the "forecast" command.

Thus, when the user states "forecast" the command software retrieves the current web page at the stored web address, parses the text to identify the web page trigger ("tomorrow's forecast"), retrieves the site content text (the text adjacent to the web page trigger until reaching HTML codes), and audibly produces the retrieved phrase to the user. If necessary, the user may also highlight and store an end content trigger so that the command software audibly produces all content between the two triggers. In these fashions, the user may create and teach the command software as many commands as desired.

The command software also responds to input from the microphone of the computer, which saves the user time in manually connecting to the internet (if necessary) (meaning starting the ISP software and logging in), accessing a particular web page(s), filling in web forms, finding information on particular web pages, and/or opening emails.

In another embodiment, a scanner is integrated with a writing implement (i.e., ink pen) to form a command holder. One end of the instrument functions as an ink pen, while the other end of the command holder functions as a scanner. Instead of scanning codes, however, the scanner is adapted to scan and record printed text. In addition, the command holder also includes a microphone to allow the user to store voice data relating to the website that is scanned and stored.

In this embodiment, the first end 401 of the command holder 400 includes the print scanner 402 that scans the text image representing the URL or web address (e.g., www.EarnAndInvest.com). In the present embodiment, the image of the web address is scanned and stored as digital data, but not converted to text until the image is downloaded to the host computer. An audio input comprising a microphone 403 is located near the middle of the command holder as well as an audio output comprising a miniature speaker 404. Similarly, near the middle of the command holder is an LCD 410 and two finger operable buttons 420, 421 that allows the user to perform various functions with the command holder such as allowing the user to determine the number of web addresses stored, to store data, and to delete (or overwrite) stored voice data or web address data.

In operation, the user will identify a print advertisement that the user wishes to store so that the user may access the web address when convenient to the user. The user actuates the select button 420 until the scan icon is displayed on the LCD 410 in the function area 411. The user then places the first end 401 of the command holder 400 at the left edge of the web address and actuates the first button 421 to turn the scanner on. The scanner, in this embodiment, is adapted to scan one line of text. The user moves the command holder 400 from left to right over the web address at a substantially constant speed. When the scanner 402 has been moved to the right edge of the text, the user de-actuates the first button 421 to turn the scanner off. In the present embodiment, the first end of the command holder also includes a scan wheel 409 that stores the speed at which the command holder is moved across the text. In other words, the speed at which the scan wheel 409 rolls across the print ad is recorded in the command holder 400 to allow the processing software to compensate for variations in the speed of movement of the command holder by the user. In this embodiment, the wheel is always placed (and rolls) along the top edge of the text so that the scanned image is always oriented in the same direction.

The scanning of the text activates the LCD display 410, which prompts the user to enter voice data at the same data index in memory by displaying the microphone icon in the function area 411. If the user does not wish to enter any voice data, the user simply actuates the select button 420 until the microphone icon disappears. If the user does wish to enter voice data, the user actuates the first button 421 and begins speaking into the microphone 403. Generally, and as is well-known in the art, the speech storage is accomplished with a filter, amplifier, analog-to-digital converter, and stored in memory (e.g., RAM). The stored speech is indexed to be associated with the recently scanned text (i.e., stored at the same data index). The command holder 400 also has the capability of recording voice data that is not associated with a web address. To do so, the user actuates the select button 420 until the microphone icon appears in the function area 411 of the LCD 410. Then, the user records the voice message as previously described.

When not scanning or recording audio, the LCD 410 displays a number representing the total of 1) the number of scanned images (with or without associated voice recordings) and 2) the number of voice recordings that do not have an associated stored image. The user may then delete or overwrite previously stored data or listen to stored voice data. To scroll to a particular stored set of data, the user actuates the select button 420 until the scroll icon appears in the function area of the LCD. The user then actuates the first button 421 until the data index (e.g., 5) of the stored data of interest is displayed on the LCD 410. As the user scrolls through the stored data, two icons may be displayed on the LCD 410. The sound icon (shaped like a human hear) is displayed to indicate that the stored data includes voice data and the image icon (shaped like an eye) is displayed to indicate that the stored data includes image data. Both or either may be displayed as dictated by the type of data that is stored at that data index. If neither icon appears, the data index is empty. Until the data storage device is full to capacity, the LCD will display at least one data index for which neither the sound or image icon is displayed. This data index is normally at the end of all the data indexes containing data (and therefore having the highest data index), but might be a data index for which the user has deleted all data. To record new data, the user scrolls to a data index for which neither icon is displayed before recording.

When the user gets to the data index of interest, the user may delete the voice message and image by actuating the select button 420 until the delete icon ("X") appears in the function area 411 of the LCD 410. The user then actuates the first button 421 to delete the image and voice data. The user may also overwrite either the image data or voice data or both. To overwrite the image data, the user actuates the select button 420 until the scan icon is displayed in the function area 411 of the LCD 410 and then proceeds to scan an image as described above. Likewise, to overwrite a voice message, the user actuates the select button 420 until the microphone icon is displayed in the function area 411 of the LCD 410 and then proceeds to record a voice message as described above. To listen to the voice message, the user actuates the select button 420 until the speaker icon is displayed in the function area 411 of the LCD 410 and then actuates the first button 421. The recorded voice message is then audibly produced at the speaker 404. Thus, the user may then decide to re-record, delete, or retain the voice message according the methods described. Listening to the voice message, of course, is only possible for data indexes in which the sound icon is displayed indicating that the data index includes voice data.

When the user wishes to access the data stored in the command holder, the user places the command holder in a docking station, which is communicatively and electrically coupled to the user's viewing station 100. Placing the command holder in the docking station automatically triggers the start (execution) of the command software application that resides on the viewing station (hereinafter "command software").

The command software downloads all of the stored information from the command holder onto the viewing station memory device (e.g., hard drive). The image files are processed to convert them to text that is stored in memory. Generally, this is accomplished by normalizing the digital information representing the scanned text according to the stored wheel speed. For portions of the image in which the recorded wheel speed is below a predetermined speed, the digital image is compressed laterally, proportionally. In other words, the further the wheel speed is below the predetermined speed, the more the digital image is compressed. For portions of the image in which the recorded wheel speed is above a predetermined speed (which may be higher than the first predetermined speed), the digital image is stretched laterally, proportionally. The stretching of the digital image need only be performed when the wheel speed is so high that the digital image will be unrecognizable by the optical character recognition software. Thus, this wheel speed, and the need to stretch the digital image, are dependent on various factors including the quality of the scanned image, the sampling rate of the scanner, the lateral size and spacing of the text being scanned, and other factors.

Once the image is normalized, it is processed by character recognition software, which is used to convert the image to a text. Character recognition software is well-known in the art and the details thereof are not repeated here. The output of the character recognition software is text (e.g., the web page address) that corresponds to the scanned image.

The command software automatically downloads and processes all of the scanned images and displays them as text (e.g., web addresses) in the main menu. For those data indexes that include both image and voice data, a sound icon is displayed next to the text. For those data indexes that include only voice data, a sound icon is displayed next to a blank text area on the main menu.

By using the viewing station's pointing device (e.g., the mouse), the user can click on the text, which will cause the command software to open the default web browser to access the web page represented by the text (that was scanned in and converted to the displayed text). Likewise, the user can click on the sound icon, which will cause the command software to audibly produce the voice data that was recorded at that data index on the viewing station's speaker 102.

Although the command holder in these examples is disclosed as integrated with an ink pen, the command holder could be integrated with a pager, a telephone, a cellular phone, personal communication device, a digital personal assistant, a handheld computer (e.g., Palm VII) or could be designed as a stand alone device. With respect to handheld devices, the processing power of the handheld computer would allow the device to immediately convert the scanned image (and/or voice message) to text—thereby providing additional confidence to the user that the correct data was stored. In addition, if the handheld computer includes a wireless (or wired) connection to the internet, the handheld computer could (at the user's discretion) immediately access the website and perform the commands providing an audible and/or visual output at the conclusion of the commands (e.g., providing confirmation of a stock trade or purchase). Furthermore, because handheld computers include some form of user input, the user could optionally provide user input by clicking on an icon to instruct the command software to execute a command previously learned in watch mode to convey information about the web site (or to use the stylus to input the web page address and select the credit card, and command from pull down menus). In addition, with the use of the stylus and internet connection, the handheld device prompts the user for additional information when the software processes a web form that includes form labels that are unknown to the command software.

In an alternate embodiment, the command holder 300 includes removable memory that is adapted to dock with the docking station to allow the computer to retrieve the stored data. The removable memory allows for additional storage (should the first memory module become full) and allows multiple users (each with their own memory module) to use the same command holder. In the present embodiment, the scanner is moved across the printed text to scan the text. In an alternate embodiment, the scanner is elongated to allow the scanning of the entire line of printed text without movement of the command holder, which would alleviate the need for the wheel.

Although the two examples of the command holder include using a voice recorder and scanner to store information, any suitable method of obtaining and storing information might be used such as swiping a magnetic card containing web address and purchase information.

In another embodiment, through the viewer's viewing station 100, the viewer accesses a web site hosted on a broadcast station 200. After accessing the web site, the viewer has a selection of categories of broadcasts. For example, the viewer may select from categories of sports, education, news, finance, health, entertainment, and art. After accessing a particular category in a conventional fashion—such as by clicking on the hyper-link, a new web page is presented to the viewer and the viewer may select from a set of subcategories within the selected category. (The term "clicking" on an image refers to the well-known actuation of the appropriate actuator (e.g., left mouse button) of the pointing device (e.g., mouse) while the cursor of the pointing device is displayed over the image (e.g., hyperlink) to be clicked. However, any suitable method of providing user input for the selections may be used, including, keyboard inputs, voice inputs, or others.) For example, when the viewer selects sports, the viewer may then select from the subcategories of football, hockey, baseball, and basketball. If the viewer selected the entertainment category, the viewer could then select one of the categories of science fiction, drama, horror, and documentary. After selecting a subcategory, the viewer may then select a particular broadcast from a selection of broadcasts. For example, when the viewer selects the football subcategory under the sports category, the viewer may then select a particular football game broadcast (e.g., Redskins vs. Cowboys). Likewise, if the viewer selects the science fiction subcategory under the entertainment category, the viewer could then select a particular movie broadcast (e.g., Star Wars). The selection of certain broadcasts, products, responses, and selections may be accomplished by the viewer clicking on the portion of the display representing the desired broadcast, product, response or selection.

The present embodiment will be further described in the context of the viewer selecting a particular football game. However, as will be recognized to one skilled in the art, the principles and concepts described are applicable to a wide range of applications.

After the user selects a particular football game, the viewing station sends a request to receive that particular football game transmission. The broadcaster receives the request and, provided the viewer is authorized to receive the broadcast, commences transmission of the football game as well as additional information that allows the viewer to customize the viewer's viewing of the football game. For example, the transmission includes options that the viewer can select that include a plurality of different selectable camera perspectives (camera transmissions). Professional football games are normally continuously filmed (videoed) from numerous cameras strategically positioned around the football game so that regardless of the location of play on the playing field, at least some of the cameras are positioned to obtain video that is suitable for broadcasting. Typically, a director will select which camera of the many cameras covering the game is broadcast to viewers and the selection changes often and repeatedly throughout the game.

In the present embodiment, the viewer can select to receive any number and combination of available camera transmissions (that the transmission rate will support). For example, the viewer may select an endzone camera transmission and an aerial camera transmission (direct overhead perspective), therefore, simultaneously viewing two camera transmissions. As the focus of play moved away from the endzone, the viewer may select other more appropriate camera transmissions. In addition, the viewer may also select the director's selection of camera transmissions.

In addition to camera transmission, the viewer may also select particular audio transmission(s). For example, the viewer may select one of a number of different sets of commentator transmissions with the option of also selecting (or alternatively selecting) a music audio transmission and/or a football playing field transmission (to hear player discussions, hits, referee discussions, etc.)

In addition to requesting particular camera transmissions and audio transmissions, the viewer can also select to receive various informational transmissions. For example, the viewer can select to receive statistical information for display. This might include the number of passes completed by a quarterback, the number of passes attempted, and the number of interceptions and touchdowns thrown by the quarterback. The particular statistical information (e.g., quarterback statistics, running back statistics, defense statistics, offense statistics) can be selected by the viewer for display until new statistics are requested. The viewer can also select a director's statistical informational transmission that will change so as to stay pertinent to events of the football game. For example, when a football team elects to attempt a field goal, the statistics transmitted and displayed would relate to field goals (e.g., total attempts, attempts made, etc.). When a team elects to punt, the punter's statistics are transmitted (e.g., average hang time, average length, etc.) as well as the punt returner's statistics (e.g., average return, longest return, etc.). Unlike television in which the director's selected statistics are often displayed, one embodiment allows the viewer to select which statistics to view, to view statistics continuously, or to suppress some or all of them.

Other information may also be transmitted in the informational transmission(s). For example, in jurisdictions where it is appropriate, the viewer may request a wagering transmission that allows the viewer to see the point spread of the football game being viewed or odds, spreads, and/or scores for other sporting events. In addition, the wagering transmission allows the viewer to immediately place wagers on the football game, other sporting events, or events in the football game. For example, the viewer may elect to place a one hundred dollar wager that the field goal kicker will make an upcoming field goal by clicking on the appropriate portion of the display displaying the wagering transmission data. After the field goal attempt, the transmission displays the viewer's wagering account balance, amount won or lost for the field goal bet and the amount won or lost cumulatively for the game and day. Similarly, a viewer may participate in an armchair quarterback contest in which the viewer competes against other viewers in attempting to guess the next offensive play or the result of the next play (e.g., touch down or first down). The viewer's success on the most recent play, the viewer's score, and relatively score in comparison to other viewers' scores is transmitted to the viewer's viewing station for display. In this embodiment, the informational transmission is transmitted as standard HTML code that is frequently updated by the broadcast station. Alternately, the informational transmissions could be sent in audio format instead of for display, with appropriate selections (e.g., available wagers) being transmitted as HTML for display.

With respect to any selection of camera transmissions, audio transmissions, and information transmissions, the software, through activation by the viewer, will save the selected configuration of transmissions as a broadcast profile. Thus, when the viewer views a football game, the viewer may save the selection of video perspectives, audio transmissions, and information transmissions as a "broadcast profile" for football. At the next occasion in which the viewer is watching a football, game the user can select that broadcast profile, which causes the viewing station software to transmit the requests for the desired transmissions to the broadcaster.

In the preferred embodiment, viewers can receive a broadcast transmission in digital form—for either live viewing or on-demand viewing—in which the broadcast is modified from its original form. The broadcast in this example is a movie, but the broadcast may comprise any transmission that a viewer wishes modify such as television shows, comic presentations, sporting events, and news broadcasts.

For example, a parent might wish to remove objectionable language (e.g., profanity) from the audio portion of a movie. In the first example of this application, a text (e.g., ASCII) version of the audio portion, which is indexed to the audio portion, is transmitted with normal audio and video portions of the movie. The viewer can then replace the profanity in the movie with less offensive words more suitable for younger viewers. More specifically, by activation by the viewer, the viewer's station's software searches for language that is deemed by the viewer to be offensive and replaces the language with less offensive language.

For example, the software includes a list of offensive words such as the word "damn." Once the software finds this word in the text file, the software replaces the word "damn" in the audio portion of the broadcast with the word "darn." This is accomplished by finding the spoken word (or phrase) in the audio transmission and measuring certain characteristics of the word that was spoken to construct a replacement word having similar characteristics. For example, once the software finds the word damn in the text, the software then analyzes the corresponding portion of the audio to measure the volume (amplitude), pitch (frequency), duration, and other well-known voice characteristics necessary for the software to construct the replacement word so that it provides the same or similar theatrical impact and without impacting the surrounding audio. In addition, background noise, music, voices, or other audio may be retained by the software as deemed necessary for the application by the designer. The software includes a list of offensive words or phrases that the viewer may select from or add to by providing appropriate viewer input to the viewing station. For example, some viewers may not find the word "damn" offensive, but find only sexually explicit terms offensive. Other viewers may find only racially derogatory terms offensive. The software thus allows viewers to censor broadcasts to their own tastes.

The software also allows viewers to select and store a plurality of different viewer profiles. For example, parents may elect to remove all offensive language (sexually explicit language and non-sexually explicit language) from movies for viewing by their children. This set of undesirable language can be stored as one viewer profile. The parents may also remove all offensive non-sexually explicit language, but not the sexually explicit language from movies for viewing by themselves. This set of undesirable language can be stored as a second viewer profile. Thus, by storing the various viewer profiles of the viewers, the software allows the viewer to quickly edit the broadcast so that it includes only the language the viewer deems non-offensive.

For some broadcast transmissions, the broadcaster of the transmission may also transmits replacement audio. The replacement audio includes words spoken by the actual actors and actresses of the movie that are generally less offensive then the word used in the movie. For example, the actress may have used the word "damn" in the movie while the actress (or impersonator) spoke the word "darn" as replacement audio. The phrases of the replacement audio transmission are indexed for easy replacement of the corresponding words in the original audio transmission by the software. Alternately, the portion of the audio transmission containing the offensive term may be deleted.

The present embodiment also has the capability of modifying the transmission when no text portion or replacement audio is transmitted. The viewing station software includes voice recognition software that finds the objectionable language in the audio. For customization of stored broadcasts (e.g., on-demand viewing), the voice recognition software converts the entire audio to text and then performs a text search for the objectionable language and replaces the objectionable language. For live broadcasts, however, the software converts each word to text, determines if that word is objectionable by comparing the word to the list of objectionable language (e.g., from a viewer profile), and replaces that word if it is objectionable. For live broadcasts, depending on the speed of the CPU of the viewing station 100, the viewing station 100 may need to buffer the received transmission to allow for processing and modification of the audio and video.

In an alternate embodiment, the voice recognition software does not convert the words to text. Instead, the words are recognized as being objectionable (or not) without converting them to text. The audio characteristics necessary to recognize each word are compared to the characteristics of the list of objectionable stored words to determine if the word is an objectionable word and is to be replaced. In practice, this comparison may include numerous mathematical computations that are well-known in the art of voice recognition and will not be repeated here.

The viewer's software also allows removal of objectionable video. Violent scenes are indexed by the originator of the broadcast or creator of the movie and can be removed or swapped with alternative scenes (supplied by the broadcaster) by the viewer resulting in a movie more suitable for younger viewers. For example, the indexing of the violent scenes is such that the viewer may elect to modify a "R" rated movie to remove the appropriate scenes so that it becomes substantially equivalent to a "PG" rated movie. Again the viewer may create numerous viewer profiles removing violent and sexual scenes from movies, and selecting ratings (e.g., G, PG, or R) for modification for younger viewers and only removing violent scenes (or selecting different ratings) for other viewers.

The viewer may also select topics of interest that are transmitted to a broadcast station. For example, a viewer may select "investing", "unidentified flying objects", and "bigfoot" as the viewer's topics of interests. For each topic of interest provided by the viewer, additional broadcast information is also provided by the viewer such as the type of broadcast transmission (e.g., fiction or nonfiction, movie or documentary, video and audio or just audio, etc.), length of the broadcast (e.g., less than two hours), cost of the broadcast (e.g., free or less than five dollars). The available selections of topics of interest and requested broadcast information are design choices based on the types of available broadcast transmissions, costs, and other factors. For example, if a broadcast station offered only free broadcast transmissions, the "cost of the broadcast transmission" would be additional broadcast information that the viewer need not supply.

These viewer broadcast requests (the viewer's topic of interests and additional broadcast information) are manually input into a web page form, transmitted to the broadcast station and the information is stored in memory at the broadcast station. At regular intervals (e.g., weekly) followed by a notification transmission to the viewer of any matching broadcast transmission(s) (e.g., via email) or in response to a request by the viewer, the computer of the broadcast station searches the available broadcast transmissions to determine whether there are any broadcast transmissions available that match the viewer's broadcast requests. Because the viewer in this example provided three topics of interest, the broadcast station will need to perform three searches. In each of the three searches, the first step is to screen out (i.e., eliminate as a possible match) all broadcast transmissions that do not match the additional broadcast information supplied with the topic of interest. In this example, the viewer requested the topic of interest "investing" and supplied the additional broadcast information of nonfiction. Thus, during the search for the topic of interest of investing (described below), the broadcast station will only search those broadcast transmissions that are nonfiction. In other words, the broadcast station only searches qualified broadcast transmissions, which are those transmissions that match the additional broadcast information supplied by the viewer for the associated topic of interest.

The search may be accomplished in two ways (i.e., either or both ways).

In the first searching method, the broadcast station searches the topic phrases (when available) that are stored along with each qualified broadcast transmissions. The topic phrases are in the form of a summary of the associated broadcast transmission for some broadcast transmissions and for other broadcast transmissions, the topic phrases are simply phrases that reflect the topics that are included in the associated broadcast transmission (e.g., "investing, stocks, stock investing, investments").

In the second searching method, text versions of the audio portion of the qualified broadcast transmissions are searched to determine whether the broadcast transmissions contain audio that includes the topics of interest. In the above example, the text versions of the qualified broadcast transmissions are searched to determine whether they contain any of the three phrases "investing", "unidentified flying objects", or "bigfoot". In some instances, the text version of the audio is supplied by the originator of the broadcast station. For those broadcast transmissions for which there is no text version and there are no topic phrases available, the broadcast station converts the audio portion of the broadcast transmission to text and stores the text for searching.

When the searching is complete, a list of broadcast transmissions matching the viewer's broadcast requests are transmitted to the viewer's viewing station for presentation to the viewer to allow the viewer to request particular broadcast transmissions for viewing.

The viewer may also provide feedback to the broadcaster about the broadcast (whether it be a movie, commercial, educational or other type of broadcast) by answering appropriate questions. The questions are transmitted by the broadcast station at appropriate times during the transmission (while the broadcast continues), at a break in the transmission where feedback is desired, or at the end of the broadcast transmission. The question(s) may take up a portion of the viewer's display, be on a separate display, be audio only, or overlay the viewer's display. Feedback can also be provided through the use of biofeedback devices that monitor the viewer's physical responses to the broadcast such as the viewer's blood pressure, skin temperature, heart rate, and brain activity (e.g., EEG). The feedback may be transmitted "live" to the broadcaster, a third party recipient, or saved and transmitted later (e.g., when the feedback gathering process is complete). As is well-known in the art, biofeedback monitoring devices that are adapted to function with standard a Windows PC are commercially available and their operation and design, therefore, is not described here.

As an example of the use of viewer feedback, the creator of a movie may wish to get viewers' reactions to one of a plurality (e.g., three) different endings to a movie. The three versions of the movie (incorporating the three different endings) are broadcast to three different test groups. Based on the biofeedback reaction of the viewers and/or answers to questions, the creator of the movie may more confidently select the best ending to put in the final version of the movie for release to the general population.

Another application of the present embodiment incorporating the viewer's input being transmitted to the broadcast station allows the viewer to interact with a broadcast transmission (e.g., a movie) by providing viewer inputs that are used, in part, to determine the content of portions of the broadcast transmission. For example, at a critical juncture in a movie, a viewer may provide input that determines whether the hero immediately returns for the girl or slays the villain. The remainder of the movie will be determined, in part, on the selection of the viewer. The transmission of the movie may require numerous inputs from the viewer, which allows the transmission to have many different story plots and outcomes.

In addition to requiring the viewer to select a course of action (or otherwise make a selection of some kind), some transmissions require the viewer to engage in a game of skill that determines the content of the remaining transmission. For example, when the hero enters a room full of villains, the hero engages in a shoot out with the villains. The viewer may then be required to click on each villain, which is registered as a hit, before the hero moves to the next scene of the movie. If the viewer fails to click on all the villains within an allotted time, the hero is slain.

When a viewer is viewing a broadcast, the viewer's identity is known to the broadcaster, either because the viewer has supplied his or her identity when purchasing the broadcast or the viewing station supplies the identity from information (e.g., a cookie) stored on the viewing station. For example, when the viewer logs in to the broadcast station, the viewer's identity (e.g., the viewer's username, name, or group of the viewer) becomes known by the broadcast station. Knowing the identity of the viewer allows the broadcaster to record various information about the viewer including the interests, likes, dislikes, typical times when the viewer views a broadcast, purchasing information of the viewer (e.g., credit card related information), etc., which is stored by the broadcaster as a customer profile. The initial data of the customer profile may include information resulting from answers by the customer to questions from the broadcaster, the type of viewing station, demographic information, etc. Information is added, deleted or modified in the customer profile as new information becomes available to the broadcaster from additional questions, purchases made by the viewer, viewing times of the purchaser, the types of broadcasts selected by the viewer, etc.

As is well-known to the general public, commercials are intermittently broadcast to viewers during a requested transmission (e.g., a movie or sitcom). However, in the case of television (and radio) the same commercials are broadcast to all viewers. Once a customer profile has been established, however, the present embodiment allows the broadcaster to select and transmit commercials containing products that are more likely to be of interest to the viewer. In addition, the broadcaster may customize the commercial so that the product has attributes that are likely to be more appealing to the viewer. The viewer is therefore more likely to purchase the product or service and the broadcaster will receive more compensation from each advertiser.

For example, if a customer profile indicates viewer A is a male, nonsmoker, who likes sports cars, enjoys playing basketball, the broadcaster will broadcast fewer (or no) commercials to viewer A for cigarettes, feminine products, or trucks. Instead, the broadcaster will transmit commercials containing products that are more likely to be of interest to viewer A such as commercials for sports cars, and basketball shoes. Thus, the broadcaster station software examines the likes and dislikes of viewers to select commercials containing products for transmission to particular viewers that are more likely to be of interest to the viewer. The bank of commercials are identified in memory (e.g., a database) by a unique identifier along with the types of viewers that more likely to find the commercial of interest. For example, the unique identifier of each cosmetic commercial is stored with information indicating that it is more likely to be interesting to female viewers. Likewise, the unique identifier of each commercial containing a basketball shoe is stored with information indicating that it is likely to be interesting to viewers who are sports fans, and even more likely to be of interest to viewers who play basketball. The number of different degrees of interest in a commercial that is stored is a design choice that is dependent on the amount of information collected from the viewers, the variation of interests of the viewers, the number of different products available, and other factors.

The customer profile also allows the broadcaster to customize commercials to the viewer's likes, dislikes, financial qualifications and/or other qualifications. For example, if the customer profile indicates that the viewer's favorite color is blue, the broadcaster can then customize a commercial relating to a sports car to be a commercial with a blue sports car instead of black sports car. Likewise, a music CD commercial may be customized to include the music CD of an artist that is liked by the viewer. Similarly, a restaurant commercial can be customized to be that of restaurant of the type liked by the viewer (seafood) and that is local to the viewer and provided with the address of the restaurant. As another example, a commercial relating to a timeshare (or house) of a greater expense may be transmitted to those viewer's known to have a high net worth or income or who are known to be financially qualified to purchase the product.

To accomplish this customizing, the broadcaster station software examines the likes, dislikes, and qualifications of viewers to select commercials for transmission to that viewer that are more likely to be of interest to the viewer (and/or for which the viewer is qualified to purchase). As discussed above, the commercials stored in the bank of commercials of products are identified in memory (e.g., a database) by a unique identifier along with the types of viewers that more likely to find the commercial of interest. Each commercial relating to a specific product (e.g., a car) is present in the bank in a multitude of variations of the commercial, with each variation having different attributes. Once a commercial's product is selected (e.g., a sports car), the variations of commercials for that product are compared to the likes, dislikes, and qualifications in the customer's profile. Using the above example, viewer A will receive a sports car commercial depicting a blue sports car while others interested in sports cars may receive the same commercial, but with the sports car being a different color.

When a commercial is being viewed by the viewer, the viewer may click on a portion of the advertisement to purchase the product. Typically, advertisements (commercials) are an attempt to sell a single product. As a result, as described with respect to the command software, the viewing station in this embodiment includes memory in which the viewer has previously stored the viewer's purchase information (e.g., address, name, credit card information, etc.). Thus, by clicking anywhere in window that is displaying the commercial of the product (or alternately on a displayed "buy" icon), the viewing station software automatically purchases the product in the commercial (in a method such as described with respect to the command software above). Alternately, for some products (e.g., cars) the viewer may click on "get information" icon transmitted by the broadcaster to have additional information transmitted to the buyer (such as the options, price, delivery time, taxes, etc.). The additional information is transmitted immediately and presented to the viewer in a separate window on the viewing station. At the viewer's discretion, the additional information may alternately be mailed to viewer, or emailed to the viewer.

For commercials that advertise a plurality of products, portions of the display (which correlate to the image of the advertised product) may be clicked on by the viewer to purchase the product. In other words, images on the broadcasted commercial overlay hyperlinks (hot spots) that may be actuated by moving the pointing device (e.g., mouse cursor) to the image and clicking the pointing device. The hyperlink web address is the address of the web page for obtaining product information and/or for purchasing the product.

At the option of the viewer, the viewing station may store commercials for later retrieval to allow a viewer to think about a product or service before making the decision to purchase. All or only selected commercials may be stored as desired by the viewer.

In addition to purchasing products in commercials, the viewer may click on a product in a movie to purchase a product. Because not all objects in a movie may be purchased, the viewer is provided an "available for purchase" indication by the broadcaster. In the present embodiment, when the viewer moves the pointing device (mouse cursor) over an object on the display that is available for purchase, the price of the object is displayed. When the viewer moves the pointing device over an object on the display that is not available for purchase, no price is displayed. When the viewer clicks on an object that is available for purchase, the viewing station places the object in a conventional shopping cart, which the user may review (and confirm the viewer's desire to purchase the products) at the end of the broadcast transmission. Likewise, the viewer may request additional information about products that are available for purchase. The viewer may pause the presentation or click on the moving video.

Optionally, the viewer may replay the stored transmission and modify the color or other attributes of the product of interest before purchasing the product. In doing so, the viewing station software examines the digital information representing the video. Those bits of information representing images that are not modifiable by the viewer are associated with an image selection code (e.g. preceded by "00") that indicates the image may not be modified. Those bits of information representing image data that is modifiable by the viewer is associated with an image selection code indicating that the image may be modified (e.g., preceded by a "01"). When the viewer selects an image (with the pointing device) that is identified as being modifiable, the software retrieves the selectable attributes (e.g., colors) that are stored (from the broadcast transmission) that are associated with that image selection code. Different images or products (e.g., cars) may have the same or different set of available selectable attributes. After selection of the desired attributes (e.g., color of blue), a portion of the video may be replayed which provides the selected image with selected attribute(s). In this embodiment, this is accomplished by replacing the data associated with the previously selected image selection code with data of the selected attribute. The method of modifying the attributes is the designer's choice and is based on the capabilities of the viewing station, the format of the broadcast transmission(s), the number and types of available attributes and many other factors that are recognizable to one skilled in the art. In general, however, the image to be modified should be discernible or selectable from other images so that data of the selected attribute can replace it. This can be accomplished through the use of associated data codes (as described), using dedicated portions of memory for selected images, or using a discernible format for the data representing modifiable images.

In still another application of the present embodiment, a seminar is transmitted to multiple viewers who have purchased the reception of the broadcast. The audio and video transmissions are transmitted with a text version of the audio, which may be displayed to the viewer at the viewer's request. The text portion is indexed to the video and audio and provides a number of benefits to the viewer. First, the text version is available for reading (either from a display or in printed form) immediately or, may be stored (e.g., on a CD or on a DVD with the audio and video) for use at a later time. The viewer can later search the text version of the audio for a particular word or words spoken by the seminar instructor. Once the word or words are found, the viewer can begin to view (the video and/or audio and/or text) portions of the seminar where the desired word or words were found. The search capabilities of the present embodiment include extensive relative word searching. For example, the searcher who received a stock seminar could search for the word "stock" within fifteen words of the word "purchase" and where the word "sell" does not appear within twenty-five words of either "stock" or "purchase." As is well-known in the art, conventional word search engines have this and other capabilities and it is the designer's choice, based on the application and the cost/benefit trade-off, what search capabilities are incorporated.

In addition, the present embodiment may also receive the broadcast of seminar in which no text version is transmitted and the software utilizes voice recognition, as is well known in the art, to convert the audio to text. The software then finds the appropriate word(s) and portion of the seminar transmission and/or stores the text for later use.

Once the desired combination of words are found, the viewer begins viewing the video and audio and/or text at a location in the broadcast that is a predetermined time (e.g., 3 seconds) before the place in the broadcast where the word or combination of words are found.

The broadcaster may also transmit indexed seminar topic headings embedded in the audio, video, or text transmission or in a separate transmission. For example, topic headings for a stock seminar might be When to Sell, When to Buy, When to Hold. When transmitted by the broadcaster, the viewer may select from a list of topic headings and view (the video and/or audio and/or text) the broadcast from the beginning of the topic within which the combination of words are found. In addition, the viewer may also search topic headings or may browse a list of topic headings to select and view.

Viewers might initially have restricted or partially restricted (e.g., no text transmitted) access to the seminar as an introduction to the seminar in hopes of selling the seminar to the viewer. In addition to the above-described transmissions, the broadcaster may also transmit other information about the seminar. For example, the broadcaster may transmit the days and times the seminar is broadcast, the number of broadcasts, the cost of the seminar, information about books or other related products, whether the broadcast includes a text portion, the methods available for purchasing the seminar, the duration of the remaining portion of the free broadcast, etc. The viewer may then purchase the seminar while receiving the introduction portion of the broadcast.

Viewers who access a restricted broadcast, do so by logging in with the entry (and transmission) of a conventional password and username. Either or both of the username and password may be stored in the viewer's computer memory (e.g., in a cookie) so that, once the viewer is registered with the broadcaster, the software on the viewer's viewing station transmits the username and password and the viewer need not enter the information.

Once logged in, the viewer may select the seminar of interest and begin receiving and viewing the broadcast(s). The broadcast transmission may include multiple transmissions. For example, one transmission includes the instructors face and voice and another transmission includes a transmission of an overhead on which the instructor makes notations and drawings.

When the viewer logs in to the broadcast station, the viewer's identity (e.g., the viewer's username, name, or group of the viewer) becomes known by the broadcast station. The registration (logging in) of viewers has benefits to the broadcaster in this application as well. For example, the seminar instructor can determine which students are in attendance. This is valuable as some educational institutions have minimum attendance requirements that are imposed on the institution by outside accrediting organizations. The broadcast station is also designed to receive (and transmit) video from viewer video cams so that instructors (through the use of software on the broadcast station) may periodically select to receive the transmission of student video cams to ensure that the students are truly attending the seminar (as opposed to logging in and leaving their computer). Transmitting and receiving audio and video to multiple viewers over the Internet is well-known in the art and the details of the design are left to the designer and, therefore, not repeated here. In addition, U.S. Pat. No. 6,011,782 to DeSimone et al., which provides an example of implementing video conferencing over the Internet, is hereby incorporated by reference.

During the seminar, the instructor may pose questions to the viewing class, which are transmitted as audio or HTML to the students' viewing stations. The viewers, who believe they know the answer to the question, respond by providing the appropriate viewer input (clicking an answer button on the GUI). The instructor then selects which viewer from whom to receive an answer, or alternatively, by default the software may select to receive the answer from the first student (viewer) who responds. The viewer's answer may be transmitted as text, audio, and/or video to the instructor only, or to the instructor and other viewers automatically or some combination thereof (at the instructor's discretion). If transmitted to the other viewers, the transmitted answer is received by the broadcaster and retransmitted to the other viewers. Alternately, if the IP address of other viewers is known to the answering viewer, the answer may be transmitted directly to other viewers by the answering viewer's viewing station. By providing the answer to the instructor only first, the instructor may screen out bad or offensive answers. In the preferred configuration of this embodiment, the video and audio is transmitted to the instructor's broadcast station and if the instructor does not stop the broadcast software within three seconds of receiving the answer, the software then automatically transmits the answer to all the students.

The instructor may also request that all the students respond to the question, which could most easily be accomplished via a multiple choice question format transmitted as HTML. The instructor may present the question verbally (audio), textually (text), or graphically to the students. The question may be transmitted as a separate broadcast or within the same broadcast as an information transmission as described above. The instructor's broadcast station then receives and tallies the viewer responses transmitted from the students' viewing stations to provide the instructor with the number and percentage of correct and incorrect answers. The instructor may use this question and answer format to get a general feel for how well the students are grasping the content of the instruction or may use it to test (and grade) each of the students' understanding of the subject matter. In the latter instance, the test is transmitted by itself and allows the viewer a predetermined time period to respond to the questions (or alternately, to each question before presenting the next question). And to reduce the likelihood of collaboration among students, all students could be scheduled to receive and take the test at the same time, but with the questions in a different order.

Another application of the present embodiment is virtual gambling. Many people enjoy gambling even though most people do no live near gambling establishments and people often travel great distances to participate in gambling. One alternative is online gaming, which is performed through software. Specifically, a computer program generates the order of cards in a virtual deck of cards that the user plays. The computer generation of the virtual deck of cards (or other gaming device such as dice or roulette) is not, by many people, considered to be trustworthy and fair. In other words, many people do not trust virtual gaming in which a computer controls the device of chance (dice, cards, or roulette).

As an alternative to this type of virtual gambling, the present embodiment allows the viewer to gamble with a real device of chance. In this application, a viewer wishes to play blackjack. The viewer logs into the gaming website and establishes credit with the broadcaster. The viewer is then assigned to a virtual chair at a blackjack table that has a minimum bet requirement and maximum allowable bet that are suitable to the viewer. Once assigned to the virtual chair, the viewer's viewing station receives transmissions from the broadcast station that allows the viewer to see all the blackjack hands being played at the table. The transmission from a video camera is of a live person acting as a dealer and who deals cards to all the players (virtual or live) who are playing at that table. The device of chance (deck(s) of cards) are thus real cards. In essence, the transmission allows the viewer to see all the cards at the table as if the viewer were actually sitting at the table. The viewer expresses his or her decisions relating to the playing of the viewer's hand (e.g., stay, hit, double down, split, or surrender) by clicking on the appropriate hyperlink (or button) on the viewing station display, which was transmitted from the broadcast station to the viewing station as HTML. The viewer's desire relating to play of the hand is then transmitted to the broadcast station and displayed to the dealer who responds accordingly (e.g., giving the viewer another card, etc.). Likewise, the viewer makes wagers by providing input to the viewing station, which is transmitted to the broadcast station and to the dealer. Other players may, or optionally, may not know the amount being wagered by another virtual player. The broadcast station (web server) is ideally located remotely from the dealer, with the dealer operating a local viewing station.

To provide the true feeling of being present, the dealer's voice is also transmitted to all viewers as well as the voice of other virtual players. Alternately for this application, instead of using the display and pointing device to transmit the viewer's decisions regarding wagering and playing of the hands, the viewer may simply speak into the microphone of the viewing station. The speech is transmitted to the broadcast station and received by the dealer who acts accordingly. Transmitting the audio to all players allows friends from different geographical locations to play and interact together as if they were in a real gambling establishment.

This application is especially applicable to games of chance such as craps and roulette. Typically, the number of people that may engage in a craps or roulette game is limited by the number of people who can physically gain access to the table to place a bet. In a virtual game as described above however, an unlimited number of people may receive a broadcast from a single roulette or craps table (i.e., the number is only limited to the number of broadcasts that can be transmitted by the broadcast station).

In another application of the present embodiment, a video conference is available for viewers who have the correct username and/or password. This embodiment can be configured through hardware and software to have one of any number of configurations depending on the viewer's desire and the application as is well-known to those skilled in the art.

After logging into the video conference, viewers can receive the audio and/or video and, if desired, the text version of the audio from a single broadcaster or a plurality of broadcasters who are engaged in a conference. In one viewer configuration, the viewer simultaneously and continuously receives the video broadcast of all participants or a select subset of the participants. In another viewer configuration, the viewer views the broadcasts of each individual participant sequentially as the participants alternatively provide input to the discussion. Alternately, the viewer may elect to receive only the video transmissions of selected participants while receiving all or select audio transmissions. Furthermore, just as the viewer can elect to receive and view transmissions of particular participants, the viewer can also select which participants are to receive the viewer's transmission. The transmission and reception configurations need not be the same (i.e., the viewer may transmit to a different set of participants than from whom the viewer is receiving) and are selectable by the viewer whose desires will be driven largely by the application (content of the broadcast) and desires of the viewers. This application is especially useful for online negotiations, chat rooms, business meetings, depositions, etc.

To allow for selectable reception and transmission of participants, the broadcast station stores a unique identifier corresponding to each participant along with the selections (relating to reception and transmission) of that participant in memory. An incoming video and audio from a participant viewer is then broadcast by the broadcast station to the addresses of the viewing stations requesting reception of the broadcast and who are also permitted (as determined by the broadcasting participant) to receive the broadcast.

In another application of the present embodiment, a virtual meeting room is provided for viewers to meet and discuss topics of common interest. For example, in one embodiment of this application, the viewer's display depicts a virtual space (a two dimensional representation of a two or, preferably, three dimensional space), which contains representations of other viewers who congregate in different groups in the virtual space, which may represent a room or a plurality of connected rooms. The representations of viewers in the preferred embodiment is a live video of the viewer being transmitted from the viewer's video cam. Alternately, the representation may be a caricature that is either created or selected by the viewer it represents. The representation may also be scanned in still photograph of the viewer's face or full body. Each group discussion is represented by a group icon that is selected by the originator or moderator of the group.

Each individual in the virtual space is depicted (to other virtual participants) in the location within the virtual space to which the individual has moved their individual representation. Individuals move their own representation to a new location in the virtual space by clicking and dragging their representation to a new location or by clicking on a group icon within the virtual space, which transmits a request for a move of their representation to the broadcast station. Through either method, data representing the request for a move of the individual's representation's to the new location is transmitted to the broadcast station, which is subsequently transmitted to other participants in the virtual space whose displays are then updated to depict the new location of the individual's representation within the virtual space.

Viewers in the virtual room may congregate in groups within the room to discuss subtopics of interest. For example, the room might be an investment discussion room. One group might be discussing stock investing and another commodity investing. Also, the room might not have a specific discussion topic and might resemble a free for all discussion as in many chat rooms.

Once in the room, the viewer may gather information about individuals in each group in the virtual room before entering the discussion. By moving the pointing device over a group icon the viewer can see group information about such as the title of the group, number of participants, names or screen names, duration of discussion, etc. Similarly, by moving the pointing device over the representation of an individual, characteristics of the represented individual are displayed to the viewer. This "participant information" includes whatever the represented individual has elected to supply and might include the persons name, age, sex, marital status, city of residence, profession, likes and dislikes, etc. By clicking on a group icon, the viewer's representation is moved adjacent the group icon and the viewer enters the group discussion and begins to receive the audio, which is the audio sent by all the participants of that group. To keep the discussions manageable, the groups may be moderated by a moderator and/or limited to a set number of transmitting participants such as ten. Once the maximum number of transmitting participants is met, no new broadcasting viewers may enter. In other words, new viewers may join to listen, but may not transmit any of their own audio or video to the group participants.

In addition to receiving the audio, viewers may elect to display the video of the viewer that is supplying the audio. The server software of the broadcast station transmitting the virtual room transmits the video in addition to the audio that is presently being transmitted by participants. People often begin speaking at the same time or, in their enthusiasm, begin talking before the previous speaker is finished speaking. This results in two or more audio broadcasts. When it is desirable to prevent multiple broadcasts, the broadcast station software monitors the audio transmissions and does not transmit a video and audio from a new source until a one second time delay has elapsed since the most recent audio transmission has terminated. The video and audio of a different participant is then transmitted as soon thereafter as the different viewer participant begins transmitting. In addition, the moderator may act as a director and decide, which audio and video is transmitted to the entire group.

In the preferred embodiment, a video transmitting the face of each group participant is continually transmitted to all the other group participants and the viewer may elect to not view particular persons by either not selecting (or de-selecting) those persons from a selection list (which results in a transmission to the broadcast station) or by closing that person's display window once opened.

The virtual room embodiment has many applications, which include business conferences, dating (singles) services, auctions (silent or otherwise), charity functions, and any social gathering in which many persons would like to attend a function without the difficulties of traveling. For example, in a silent auction application, the discussion groups have topics that correspond to particular items (e.g., a grandfather clock) or groups of items (e.g., clocks) that are being auctioned. The items for auction are represented by an icon, which in this example includes a representative photograph, title, and highest bid. A viewer learns more about the item by moving the pointing device over the icon. The viewer station will then display additional photographs (from different perspectives) of the item, a textual (or alternately audio) description, and the history of bids. The viewer may then make a bid by clicking an appropriate hyperlink transmitted by the broadcast station.

The viewer may also select a number of auction items from a list to monitor. The items that are monitored by the viewer are displayed in a monitoring window, which lists the title of the item, a photo, the highest bid, and the highest bidders bid number (or other information identifying the highest bidder). This allows the viewer to quickly monitor items of interest to determine if the viewer has been out bid so that the viewer may increase his or her bid.

The infrastructure of various embodiments consists of both hardware and software. The details of the infrastructure are left to the designer and will vary depending on the costs and benefits, compatibility with existing technology (hardware and software), the application, the particular embodiment, and various other factors. Thus, a multitude of variations are described and components of any particular embodiment can be readily used with the components of other embodiments as will be readily ascertainable by one skilled in the art. In addition, the components providing the same or similar functionality of another disclosed component may be substituted. In fact, as technology progresses, one skilled in the art would expect that the components disclosed (both hardware and software) to be replaced with faster, smaller, cheaper, and/or better components having enhanced functions and more adaptable to particular applications (e.g., portability). Likewise, features described in one embodiment might be used with features described in another embodiment and still be within the scope of the invention.

The invention claimed is:

1. A method comprising:
capturing, at a mobile device, an image;
generating, at the mobile device, text from the image using a recognition algorithm;
displaying, at the mobile device, the text using a user interface;
receiving, at the mobile device, an input selecting the displayed text through a pointing device of the user interface;
opening, at the mobile device, a web browser in response to the input; and
accessing a web page with the web browser based on the text in response to the input.

2. The method of claim 1, further comprising:
receiving, at the mobile device, supplemental information associated with the image.

3. The method of claim 1, wherein receiving, at the mobile device, the supplemental information associated with the image comprises receiving, at the mobile device, voice information associated with the image.

4. The method of claim 1, further comprising transmitting a web address to a remote system.

5. The method of claim 1, further comprising parsing the text for at least one word.

6. The method of claim 1, wherein the image includes at least a part of an image of a product, the method further comprising:
receiving, at the mobile device, information regarding the product; and
presenting, at the mobile device, the information regarding the product.

7. The method of claim 6, further comprising:
transmitting, from the mobile device, an instruction to purchase the product.

8. The method of claim 1, wherein the image includes textual characters, and the recognition algorithm is an optical character recognition algorithm.

9. A mobile device, comprising:
an image input device configured to capture an image;
a communication device;
a user interface; and
a processor in operative association with the image input, device, user interface, and communication device, the processor configured to:
receive the image from the image input device;
recognize content within the image;
associate text with the content;
display the text using the user interface;
receive an input selecting the displayed text through a pointing device of the user interface;
open, at the mobile device, web browser in response to the input; and
access a web page with the web browser based on to the text in response to the input.

10. The mobile device of claim 9, wherein the processor is further configured to transmit a web address to a remote system based on the text.

11. The mobile device of claim 9,
wherein the processor is further configured to:
receive information regarding a product using the communication device; and
present the information regarding the product using the user interface.

12. The mobile device of claim 11, wherein the processor is further configured to transmit an instruction to purchase the product using the communication device.

13. A non-transitory computer-readable medium having instructions stored thereon, the instructions for executing on a mobile device, the instructions comprising:
instructions for capturing, at the mobile device, an image;
instructions for determining, at the mobile device, text associated with the image using a recognition algorithm;
instructions for displaying, at the mobile device, the text using a used interface;
instructions for receiving, at the mobile device, an input selecting the displayed text through a pointing device of the user interface;
instructions for opening, at the mobile device, a web browser in response to the input; and
instructions for accessing a web page with the web browser based on the text in response to the input.

14. The non-transitory computer-readable medium of claim 13, the instructions further comprising instructions for transmitting a web address to a remote system.

15. The non-transitory computer-readable medium of claim 13, the instructions further comprising instructions for parsing the text for at least one word.

16. The non-transitory computer-readable medium of claim 13, wherein the image includes at least a part of an image of a product, the instructions further comprising:
instructions for receiving, at the mobile device, information regarding the product; and
instructions for presenting, at the mobile device, the information regarding the product.

* * * * *